US011940324B2

(12) United States Patent
Gunnam et al.

(10) Patent No.: US 11,940,324 B2
(45) Date of Patent: Mar. 26, 2024

(54) SYSTEMS AND METHODS FOR EFFICIENT MULTI-RETURN LIGHT DETECTORS

(71) Applicant: VELODYNE LIDAR USA, INC., San Jose, CA (US)

(72) Inventors: Kiran Kumar Gunnam, Santa Clara, CA (US); Kanke Gao, Fremont, CA (US); Nitinkumar Sagarbhai Barot, San Jose, CA (US); Anand Gopalan, Foster City, CA (US); David S. Hall, Oakland, CA (US)

(73) Assignee: Velodyne Lidar USA, Inc., San Jose, CA (US)

(*) Notice: Subject to any disclaimer, the term of this patent is extended or adjusted under 35 U.S.C. 154(b) by 21 days.

(21) Appl. No.: 17/675,997

(22) Filed: Feb. 18, 2022

(65) Prior Publication Data

US 2023/0003579 A1 Jan. 5, 2023

Related U.S. Application Data

(60) Division of application No. 16/909,926, filed on Jun. 23, 2020, now Pat. No. 11,255,728, which is a
(Continued)

(51) Int. Cl.
*G01S 17/00* (2020.01)
*G01J 3/00* (2006.01)
(Continued)

(52) U.S. Cl.
CPC .......... *G01J 3/2803* (2013.01); *G01S 7/4865* (2013.01); *G01S 17/42* (2013.01); *G01S 17/50* (2013.01);
(Continued)

(58) Field of Classification Search
USPC ........................................................ 356/5.01
See application file for complete search history.

(56) References Cited

U.S. PATENT DOCUMENTS 3,873,211 A 3/1975 Watson
5,565,870 A 10/1996 Fukuhara et al.
(Continued)

FOREIGN PATENT DOCUMENTS

CN 107085213 A 8/2017
EP 2618179 A1 7/2013
(Continued)

OTHER PUBLICATIONS

Extended European Search Report for European Application No. EP 18885956.5 dated Apr. 30, 2021.
(Continued)

*Primary Examiner* — James R Hulka
(74) *Attorney, Agent, or Firm* — Kilpatrick Townsend & Stockton LLP

(57) ABSTRACT

Described herein are systems and methods that may efficiently detect multi-return light signals. A light detection and ranging system, such as a LIDAR system, may fire a laser beam that may hit multiple objects with a different distance in one line, causing multi-return light signals to be received by the system. Multi-return detectors may be able to analyze the peak magnitude of a plurality of peaks in the return signals and determine a multitude of peaks, such as the first peak, the last peak and the maximum peak. One embodiment to detect the multi-return light signals may be a multi-return recursive matched filter detector. This detector comprises a matched filter, peak detector, centroid calculation and a zeroing out function. Other embodiments may be based on a maximum finder that algorithmically selects the highest
(Continued)

magnitude peaks from samples of the return signal and buffers for regions of interests peaks.

8 Claims, 18 Drawing Sheets

Related U.S. Application Data continuation of application No. 15/835,374, filed on Dec. 7, 2017, now Pat. No. 10,690,773.

(51) Int. Cl.
| | |
|---|---|
| *G01J 3/28* | (2006.01) |
| *G01S 7/48* | (2006.01) |
| *G01S 7/4865* | (2020.01) |
| *G01S 17/42* | (2006.01) |
| *G01S 17/50* | (2006.01) |
| *G01S 17/86* | (2020.01) |
| *G01S 17/89* | (2020.01) |

(52) U.S. Cl.
CPC ............. *G01S 17/86* (2020.01); *G01S 17/89* (2013.01); *G01J 2003/2863* (2013.01)

(56) References Cited

U.S. PATENT DOCUMENTS

| | | | |
|---|---|---|---|
| 5,835,199 A | 11/1998 | Phillips et al. | |
| 7,219,038 B2 | 5/2007 | Tracy | |
| 7,379,016 B1 | 5/2008 | McEwan | |
| 7,456,970 B1 | 11/2008 | Lopez et al. | |
| 7,460,250 B2 | 12/2008 | Keightley | |
| 7,685,873 B2 | 3/2010 | Shapira | |
| 7,969,558 B2 | 6/2011 | Hall | |
| 7,995,796 B2 | 8/2011 | Retterath | |
| 8,434,358 B2 | 5/2013 | Asahara | |
| 8,675,181 B2 | 3/2014 | Hall | |
| 8,767,190 B2 | 7/2014 | Hall | |
| 9,086,488 B2 | 7/2015 | Tchoryk, Jr. | |
| 9,335,255 B2 | 5/2016 | Retterath | |
| 9,383,753 B1 | 7/2016 | Templeton et al. | |
| 9,529,079 B1 | 12/2016 | Droz et al. | |
| 9,964,632 B1 | 5/2018 | Droz et al. | |
| 10,690,773 B2 | 6/2020 | Gunnam et al. | |
| 11,255,728 B2 | 2/2022 | Gunnam et al. | |
| 2001/0055425 A1* | 12/2001 | Chiu | G01D 5/39 |
| | | | 382/199 |
| 2005/0111009 A1 | 5/2005 | Keightley et al. | |
| 2006/0217938 A1 | 9/2006 | Tracy | |
| 2006/0262324 A1 | 11/2006 | Hays | |
| 2009/0122295 A1 | 5/2009 | Eaton | |
| 2009/0252376 A1 | 10/2009 | Retterath | |
| 2010/0017060 A1 | 1/2010 | Zhang | |
| 2010/0020306 A1 | 1/2010 | Hall | |
| 2010/0152600 A1 | 6/2010 | Droitcour et al. | |
| 2010/0253932 A1 | 10/2010 | Shapira | |
| 2010/0302528 A1 | 12/2010 | Hall | |
| 2011/0216304 A1 | 9/2011 | Hall | |
| 2011/0219869 A1 | 9/2011 | Asahara | |
| 2012/0112952 A1* | 5/2012 | Logan | G01S 13/24 |
| | | | 342/118 |
| 2012/0169053 A1 | 7/2012 | Tchoryk, Jr. | |
| 2012/0287417 A1 | 11/2012 | Mimeault | |
| 2012/0314037 A1 | 12/2012 | Nehmadi | |
| 2013/0038485 A1 | 2/2013 | Nakamura | |
| 2013/0258312 A1 | 10/2013 | Lewis | |
| 2013/0314694 A1 | 11/2013 | Tchoryk, Jr. | |
| 2014/0079248 A1* | 3/2014 | Short | G10L 25/18 |
| | | | 381/119 |
| 2014/0159925 A1 | 6/2014 | Mimeault | |
| 2014/0293052 A1* | 10/2014 | Kuehnle | B60R 11/02 |
| | | | 382/104 |
| 2015/0153271 A1 | 6/2015 | Retterath | |
| 2015/0185328 A1 | 7/2015 | Kotake | |
| 2015/0287422 A1* | 10/2015 | Short | G01S 3/74 |
| | | | 704/211 |
| 2016/0084945 A1 | 3/2016 | Rodrigo et al. | |
| 2016/0091609 A1 | 3/2016 | Ismail | |
| 2016/0103204 A1* | 4/2016 | Valentine | G01S 7/022 |
| | | | 342/20 |
| 2017/0168161 A1 | 6/2017 | Shapira | |
| 2017/0219695 A1 | 8/2017 | Hall et al. | |
| 2017/0242106 A1 | 8/2017 | Dussan et al. | |
| 2017/0242107 A1 | 8/2017 | Dussan et al. | |
| 2018/0032042 A1 | 2/2018 | Turpin | |
| 2018/0059228 A1 | 3/2018 | Raina | |
| 2018/0284226 A1 | 10/2018 | LaChapelle | |
| 2019/0049582 A1 | 2/2019 | Hayashi et al. | |
| 2019/0179018 A1 | 6/2019 | Gunnam et al. | |
| 2019/0346571 A1* | 11/2019 | Furumoto | G01S 7/4876 |
| 2020/0319338 A1 | 10/2020 | Gunnam et al. | |

FOREIGN PATENT DOCUMENTS

| | | | | |
|---|---|---|---|---|
| JP | H07-294628 A | | 11/1995 | |
| JP | H10-221448 A | | 8/1998 | |
| JP | 2013-036928 A | | 2/2013 | |
| WO | WO-2017138155 A1 * | | 8/2017 | ............. G01S 17/10 |
| WO | WO-2017208375 A1 * | | 12/2017 | ................ G01P 5/26 |

OTHER PUBLICATIONS

Extended European Search Report for European Application No. EP 18885956.5 dated Oct. 1, 2021.
International Search Report in PCT/US2018/059264, dated Jan. 18, 2019 (2 pages).
Japanese Patent Office, JP Application No. 2020-531048, Notice of Reasons for Rejection, dated Jun. 17, 2022 (9 pages).
English Translation, JP Application No. 2020-531048, Notice of Reasons for Rejection, dated Jun. 17, 2022 (8 pages).
Written Opinion in PCT/US2018/059264, dated Jan. 18, 2019 (8 pgs).
EP18885956.5, "Office Action", dated Jul. 12, 2023, 8 pages.
"Matched Filter," Wikipedia, Nov. 21, 2017, available at: https://en.wikipedia.org/w/index.php?title=Matched_filter&oldid=811437564.
CN201880078830-2, "Office Action", dated Sep. 20, 2023, 19 pages.

* cited by examiner

For LiDAR the light source is a laser

Single emitter/detector pair rotating mirror lidar design

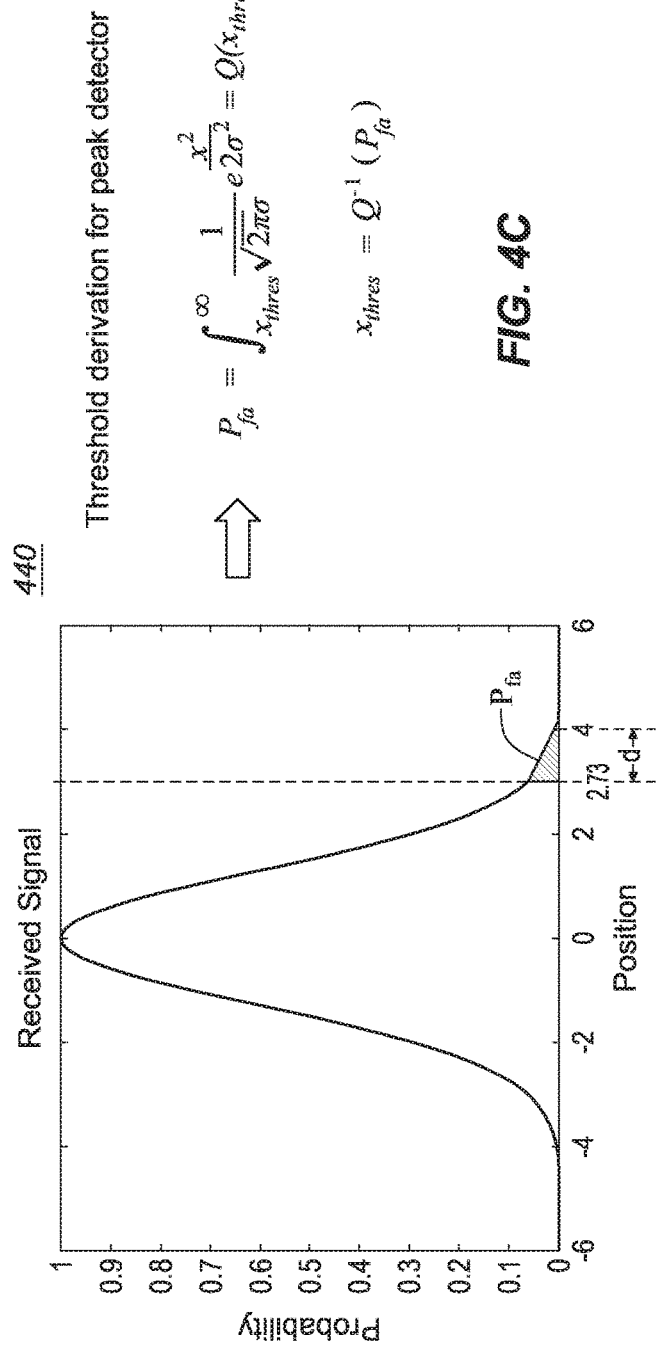

SYSTEMS AND METHODS FOR EFFICIENT MULTI-RETURN LIGHT DETECTORS

CROSS-REFERENCE TO RELATED APPLICATIONS

The present application is a divisional application of and claims priority to U.S. patent application Ser. No. 16/909,926, filed Jun. 23, 2020, which is a continuation of and claims priority to U.S. patent application Ser. No. 15/835,374 (now U.S. Pat. No. 10,690,773) titled "Systems and Methods for Efficient Multi-Return Light Detectors" and filed Dec. 7, 2017, each of which is hereby incorporated by reference herein in its entirety.

BACKGROUND

A. Technical Field

The present disclosure relates generally to systems and methods for detection of multi-return light signals. More particularly, the present disclosure may relate to a LIDAR (Light Detection and Ranging) system.

B. Background

Light detection and ranging systems, such as LIDAR systems, may employ pulses of light to measure distance to an object based on the time of flight (TOF) of each pulse of light. A pulse of light emitted from a light source of a light detection and ranging system interacts with a distal object. A portion of the light reflects from the object and returns to a detector of the light detection and ranging system. Based on the time elapsed between emission of the pulse of light and detection of the returned pulse of light, the distance to the object may be estimated. In some embodiments, pulses of light may be generated by a laser emitter. The light pulse may be focused through a lens or lens assembly. The light pulse may hit multiple objects, each having a different distance from the laser, causing multi-return signals to be received by the light detection and ranging system detector. Multi-return signals may provide more information of the environment to improve mapping or reconstruction. A dedicated detector may be required to precisely identify each return with its associated time delay information.

Generally, light detection and ranging system detectors are based on peak detection technology and may only detect and record one or at most two returns. In one embodiment, a matched filter associated with a peak detector may only detect one return. Such detector methods may limit the accuracy of mapping or reconstruction.

Accordingly, what is needed are systems and methods that may efficiently detect multi-return light signals in a light detection and ranging system, such as LIDAR system.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 4C graphically illustrates threshold derivation for a peak detector according to embodiments of the current disclosure.

FIG. 4D graphically illustrates setting a threshold in a "sunny" noise environment.

FIG. 4E graphically illustrates setting a threshold in a "fog" noise environment.

DETAILED DESCRIPTION OF EMBODIMENTS

Figure 1:
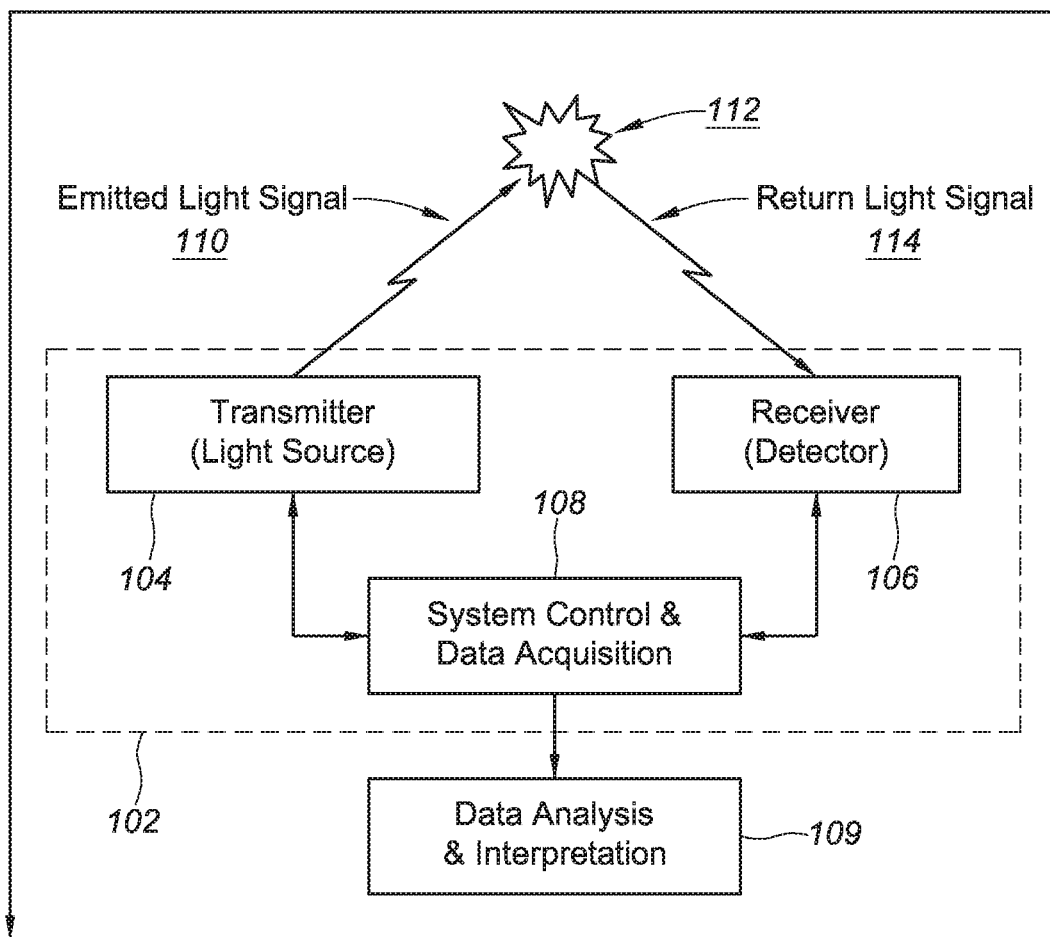
FIG. 1 depicts the operation of a light detection and ranging system according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Light Detection and Ranging System

A light detection and ranging system, such as a LIDAR system, may be a tool to measure the shape and contour of the environment surrounding the system. LIDAR systems may be applied to numerous applications including both autonomous navigation and aerial mapping of a surface. LIDAR systems emit a light pulse that is subsequently reflected off an object within the environment in which a system operates. The time each pulse travels from being emitted to being received may be measured (i.e., time-of-flight "TOF") to determine the distance between the object and the LIDAR system. The science is based on the physics of light and optics.

In a LIDAR system, light may be emitted from a rapidly firing laser. Laser light travels through a medium and reflects off points of things in the environment like buildings, tree branches and vehicles. The reflected light energy returns to a LIDAR receiver (detector) where it is recorded and used to map the environment.

FIG. 1 depicts operation 100 of a light detection and ranging system 102 according to embodiments of the present document. Light detection and ranging system 102 may comprise a transmitter 104 that transmits emitted light signal 110, receiver 106 comprising a detector, and system control and data acquisition 108. Emitted light signal 110 propagates through a medium and reflects off object 112. Return light signal 114 propagates through the medium and is received by receiver 106. System control and data acquisition 108 may control the light emission by transmitter 104 and the data acquisition may record the return light signal 114 detected by receiver 106. Data analysis & interpretation 109 may receive an output from system control and data acquisition 108 and perform data analysis functions. Transmitter 104 and receiver 106 may include an optical lens (not shown). Light detection and ranging system 102 may be a LIDAR system and transmitter 104 may emit a laser beam have a plurality of pulses in a particular sequence.

Figure 2:
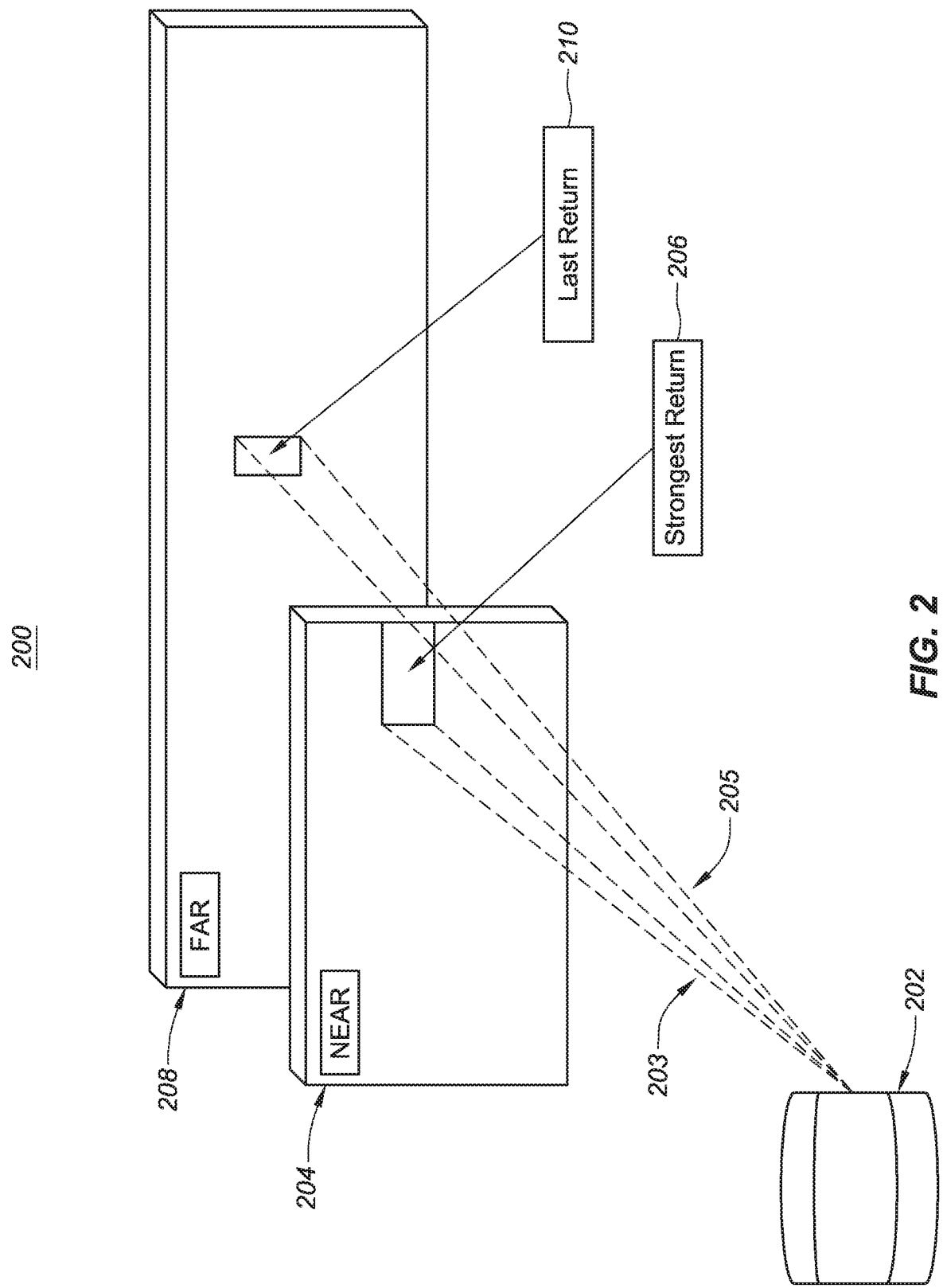
FIG. 2 illustrates the operation of a light detection and ranging system and multi-return light signals according to embodiments of the present document.

FIG. 2 illustrates the operation 200 of light detection and ranging system 202 including multi-return light signals: (1) return signal 203 and (2) return signal 205 according to embodiments of the present document. Light detection and ranging system 202 may be a LIDAR system. Due to the laser's beam divergence, a single laser firing often hits multiple objects producing multiple returns. The light detection and ranging system 202 may analyze multiple returns and may report either the strongest return, the last return, or both returns. Per FIG. 2, light detection and ranging system 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. Light detection and ranging system 202 may record both returns only if the distance between the two objects is greater than minimum distance. In both single and multi-return LIDAR systems, it is important that the return signal is accurately associated with the transmitted light signal so that an accurate TOF is calculated.

Some embodiments of a LIDAR system may capture distance data in a 2-D (i.e. single plane) point cloud manner. These LIDAR systems may be often used in industrial applications and may be often repurposed for surveying, mapping, autonomous navigation, and other uses. Some embodiments of these devices rely on the use of a single laser emitter/detector pair combined with some type of moving mirror to effect scanning across at least one plane. This mirror not only reflects the emitted light from the diode, but may also reflect the return light to the detector. Use of a rotating mirror in this application may be a means to achieving 90-180-360 degrees of azimuth view while simplifying both the system design and manufacturability.

Figure 3:
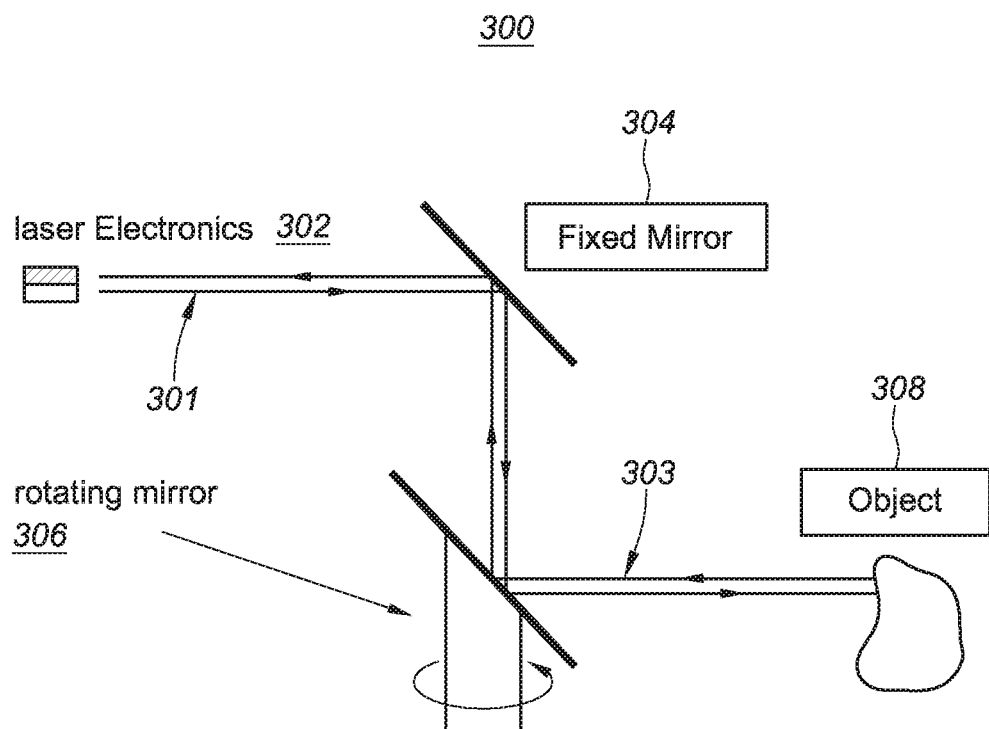
FIG. 3 depicts a LIDAR system with a rotating mirror according to embodiments of the present document.

FIG. 3 depicts a LIDAR system 300 with a rotating mirror according to embodiments of the present document. LIDAR system 300 employs a single laser emitter/detector combined with a rotating mirror to effectively scan across a plane. Distance measurements performed by such a system are effectively two-dimensional (i.e., planar), and the captured distance points are rendered as a 2-D (i.e., single plane) point cloud. In some embodiments, but without limitations, rotating mirrors are rotated at very fast speeds e.g., thousands of revolutions per minute. A rotating mirror may also be referred to as a spinning mirror.

LIDAR system 300 comprises laser electronics 302, which comprises a single light emitter and light detector. The emitted laser signal 301 may be directed to a fixed mirror 304, which reflects the emitted laser signal 301 to rotating mirror 306. As rotating mirror 306 "rotates", the emitted laser signal 301 may reflect off object 308 in its propagation path. The reflected signal 303 may be coupled to the detector in laser electronics 302 via the rotating mirror 306 and fixed mirror 304.

As previously noted, time of flight or TOF is the method a LIDAR system uses to map the environment and provides a viable and proven technique used for detecting target objects. Simultaneously, as the lasers fire, firmware within a LIDAR system may be analyzing and measuring the received data. The optical receiving lens within the LIDAR system acts like a telescope gathering fragments of light photons returning from the environment. The more lasers employed in a system, the more the information about the environment may be gathered. Single laser LIDAR systems may be at a disadvantage compared with systems with multiple lasers because fewer photons may be retrieved, thus less information may be acquired. Some embodiments, but without limitation, of LIDAR systems have been implemented with 8, 16, 32 and 64 lasers. Also, some LIDAR embodiments, but without limitation, may have a vertical field of view (FOV) of 30-40° with laser beam spacing as tight as 0.3° and may have rotational speeds of 5-20 rotations per second.

The rotating mirror functionality may also be implemented with a solid state technology such as MEMS.

B. Multi-Return Matched Filter Detectors

As previously noted, one objective for a LIDAR system is the efficient detection of multi-return light signals. One method to achieve this objective may be a multi-return matched filter detector.

For LIDAR sensors, one laser fire may hit multiple objects with a different distance in one line, causing multiple return signals to be received, as discussed relative to FIG. 2. In some embodiments, a dedicated detector may be required to precisely identify each return with time delay information. Multi-return perception provides more information of environment for mapping or reconstruction. Many current LIDAR detectors are based on peak detection and may only detect and record one or at most two returns. This architecture may limit the accuracy of mapping or reconstruction.

1. Peak Detectors

Figure 4A:
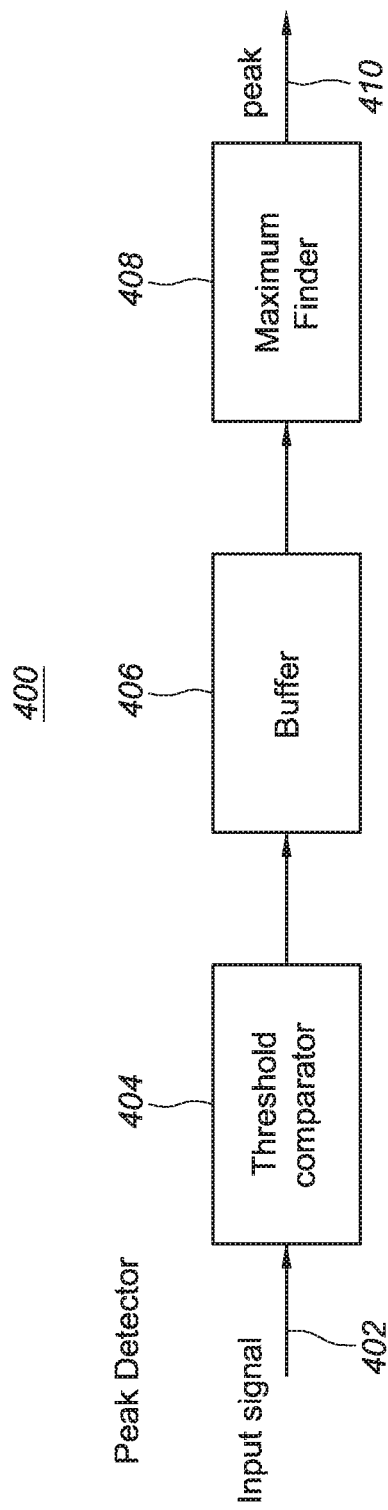
FIG. 4A depicts a peak detector according to embodiments of the current disclosure.

In simple terms, a peak detector may be a detector whose output voltage approximates the true peak value of an applied signal. The peak detector tracks the signal in a sample mode and preserves the highest input signal in a hold mode. FIG. 4A depicts peak detector 400 according to embodiments of the current disclosure. An input signal 402 may be coupled to a threshold comparator 404, which in turn may be coupled to a buffer 406, which in turn may be coupled to a maximum finder 408. The output of maximum finder 408 may be peak signal 410. The operational steps of the peak detector 400 may include: (1) Threshold Comparator 404: Compare input signal 402 with a pre-set threshold, and generate output signal samples that may be greater than the pre-set threshold; (2) Buffer 406: Buffer output samplers received from threshold comparator 404; and (3) Maximum finder 408: Determine the maximum output signal samples among the samples in buffer 406 and generate peak signal 410. In one embodiment, maximum finder determines the largest peak. In another embodiment, the maximum finder determines the largest peak and the second largest peak. The operational steps may be executed in a specific time period. By way of example, but without limitations, a detector may operate at 8 samples per clock period. Therefore, for 1000 samples, the specific time period may be 1000/8 or 125 clock periods. A clock period may be a millisecond. A challenge with peak detectors can be that they may need to operate at their highest (signal-to-noise) S/N ratio in order to distinguish the signal from the noise. This may mean setting a high threshold in threshold comparator 404.

Figure 4B:
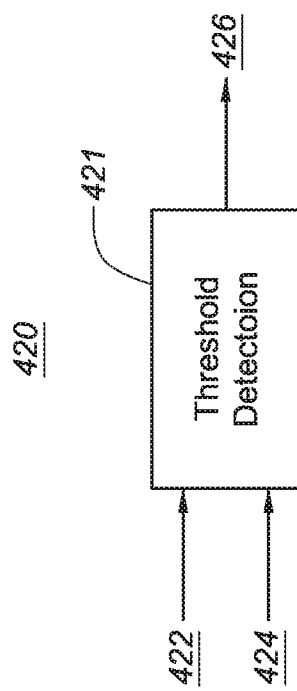
FIG. 4B depicts threshold detection based on the operating noise environment and a target error rate (false alarm) according to embodiments of the current disclosure.

FIG. 4B depicts embodiment 420 of threshold detection 421 based on the operating noise environment and a target error rate (false alarm) according to embodiments of the current disclosure. The operating noise 422 and the targeted error rate 424 may be input into threshold detection 421, which may determines a threshold 426. When the operating noise 422 and/or the targeted error rate vary, the threshold 426 may be adjusted. Threshold 426 may define the pre-set threshold of threshold comparator 404 of peak detector 400.

Peak detection may be based on threshold detection or slope detection. For the case of threshold detection, a threshold derivation for a peak detector 440 may be utilized to achieve a certain probability of false alarm ($P_{fa}$), as illustrated in FIG. 4C. The goal may be to achieve a certain level of false alarm, $P_{fa}$, i.e., error rate. Conditions for the threshold derivation may include: no signal and only additive white Gaussian noise (AWGN), The distribution of the received signal may be viewed in FIG. 4C, which graphically illustrates the threshold derivation for a peak detector according to embodiments of the current disclosure. In FIG. 4C the y-axis represents the probability and the x-axis represents the position for the received signal displayed in a Gaussian distribution. More specifically, FIG. 4C illustrates the relationship between false alarms and noise characteristics. The value for $P_{fa}$ may be calculated as follows:

$$P_{fa} = \int_{x_{thres}}^{\infty} \frac{1}{\sqrt{2\pi}\,\sigma} e^{-\frac{x^2}{2\sigma^2}} = Q(x_{thres})$$

where,
σ=standard deviation of AWGN, $x_{thres} = Q^{-1}(P_{fa})$

For noise statistics, mean value and RMS value of noise of an input signal may be calculated by excluding the samples above a threshold for the peak of a signal.

The inverse Q function may be independent of the noise environment. A first threshold may be dynamically determined based on the operating noise environment and a target false alarm, $Pf_a$. An analysis may be performed to determine the operational noise environment utilizing a matched filter. The threshold may be adjusted based on the matched filter noise analysis and the target false alarms (error rate). Per FIG. 4C, the threshold is indicated with a value of 2.73 (or 273). The shaded area indicates the operating conditions for the false alarm $Pf_a$. The distance d represents the position range (4−2.73=1.27) where a false alarm $Pf_a$ may occur. For noise statistics, mean value and RMS value of noise of an input signal may be calculated by excluding the peak samples above a threshold for the peak of a signal.

A FIG. 4D and FIG. 4E also illustrate the concept of threshold adjustment based on the operational noise and the target false alarms (error rate) via embodiment 450 and embodiment 460. In FIG. 4D and FIG. 4E, the y-axis represents the signal strength and the x-axis represents time. In FIG. 4D, the received signal 452 may be propagating in a "sunny" environment and has a noise level 456. To achieve a targeted error rate (false alarms, $Pf_a$), the threshold 454 may be set above noise level 456. Similarly, In FIG. 4E, the received signal 462, having the same shape and amplitude as received signal 452, may be propagating in a "fog" environment and has a noise level 466. To achieve the same targeted error rate (false alarms, $Pf_a$) as in FIG. 4D, the threshold 464 may be set above noise level 466. Because noise level 456 may be lower than noise level 466, threshold 454 may be lower than threshold 464. A "sunny environment may support a range of 200 meter and a "fog" environment may support a range of 100 meters.

2. Matched Filter Detectors Solutions

Figure 5:
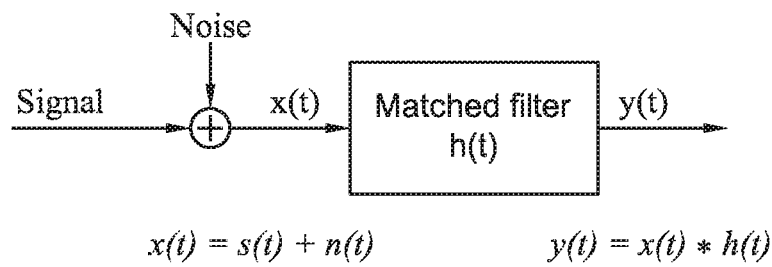
FIG. 5 depicts a matched filter according to embodiments of the present disclosure.

In telecommunications and other applications, a matched filter may be an optimal linear filter for maximizing the signal to noise ratio (SNR) for a known signal in the presence of additive stochastic noise. Matched filters may be often used in signal detection to correlate a known signal, or template, with an unknown signal to detect the presence of the template in the unknown signal. More specifically, a matched filter may be a frame work of filters, which process received signal by correlating with known template (i.e. filter) to maximize signal to noise ratio (SNR). FIG. 5 depicts a matched filter 500 according to embodiments of the present disclosure. Per FIG. 5, under condition of additive white Gaussian noise (AWGN), an optimal matched filter may be achieved when the value of the signal (s(t)) is equal to the value of the filter (h(t)).

Figure 6:
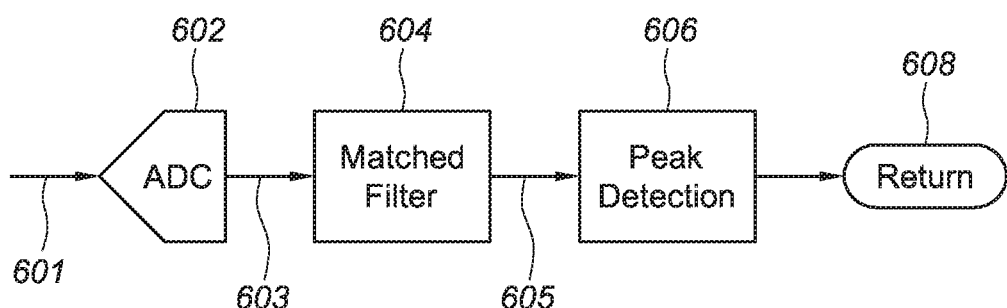
FIG. 6 depicts a light detector based on a matched filter and peak detector according to embodiments of the present disclosure.

FIG. 6 depicts a light detector 600 based on a matched filter 604 and peak detection 606 according to embodiments of the present disclosure. Light detector 600 comprises ADC 602 which may convert a multi-return signal 601 to input signal 603. Input signal 603 may be processed by matched filter 604 in order to optimize the S/N ratio of input signal 603. Optimized signal 605 may be coupled to peak detection 606, which generates a peak return signal 608. Light detector 600 may be limited to detection of a single peak in a return signal.

Figure 7:
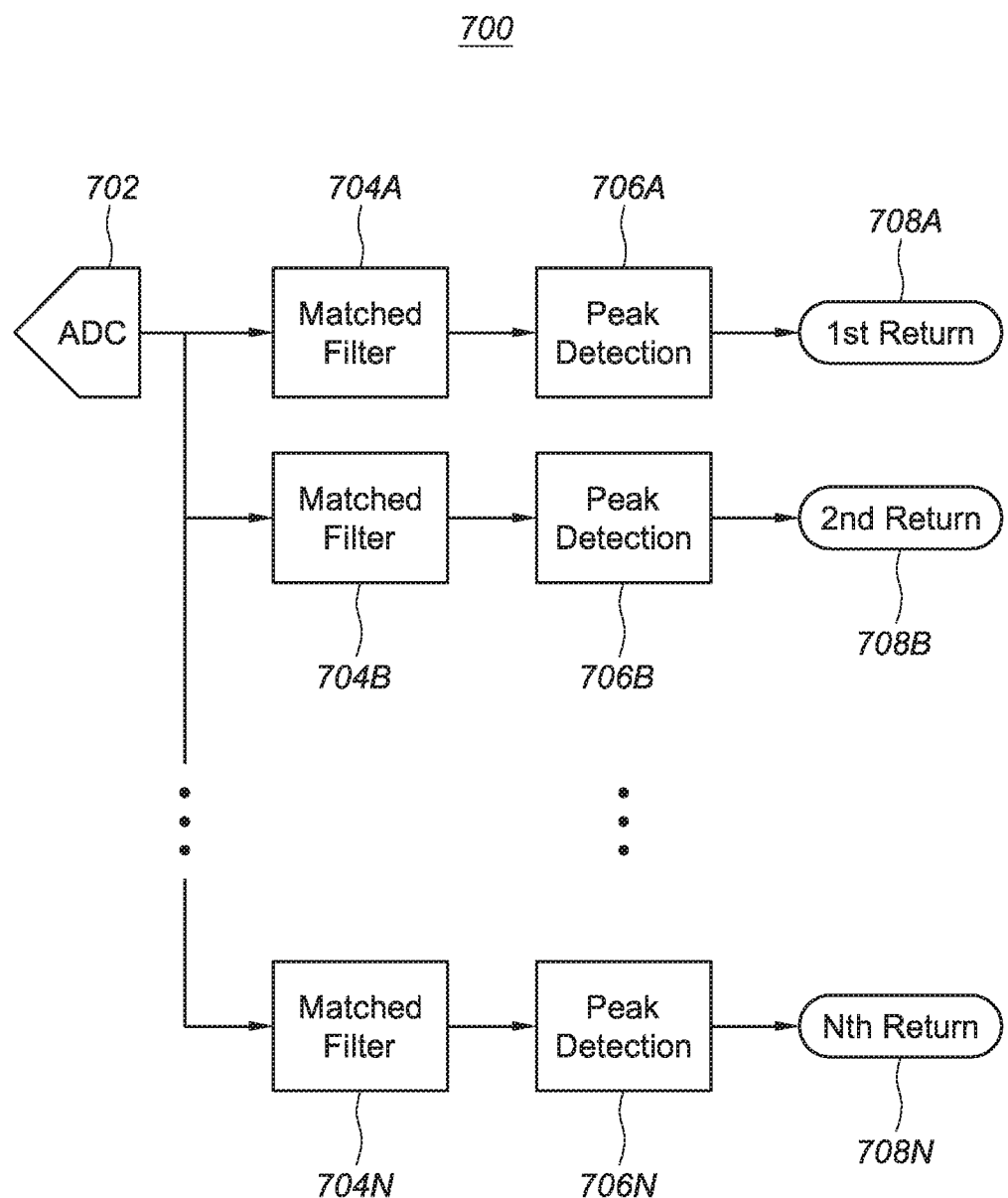
FIG. 7 depicts a multi-return matched filter detector according to embodiments of the present document.

FIG. 7 depicts a multi-return matched filter detector 700 according to embodiments of the present document. Multi-return matched filter detector 700 may be able to detect multiple peaks in a multi-return signal. Multi-return matched filter detector 700 may comprise N parallel matched filters (704A, 704B, . . . 704N) and N parallel peak detection detectors (706A, 706B, . . . 706N). ADC 702 may convert a multi-return signal to an input signal for the N parallel matched filters. As discussed relative to FIG. 6, matched filter 604 and peak detection 606, each of the N parallel matched filters (704A, 704B, . . . 704N) may optimize the S/N ratio of the input signal and couple the optimized signal to a corresponding N parallel peak detection detectors (706A, 706B, . . . 706N).

Each of the N parallel peak detection detectors (706A, 706B, 706N) may operate with a different threshold in order to identify signal peaks of different values. The N parallel peak detection detectors (706A, 706B, . . . 706N) each generate a corresponding peak return signals 1st, 2nd, . . . Nth (708A, 708B, . . . 708N). From peak return signals 708A, 708B, . . . 708N a first/last and maximum peak may be determined.

3. Recursive Matched Filter Detector Solutions

Figure 8:
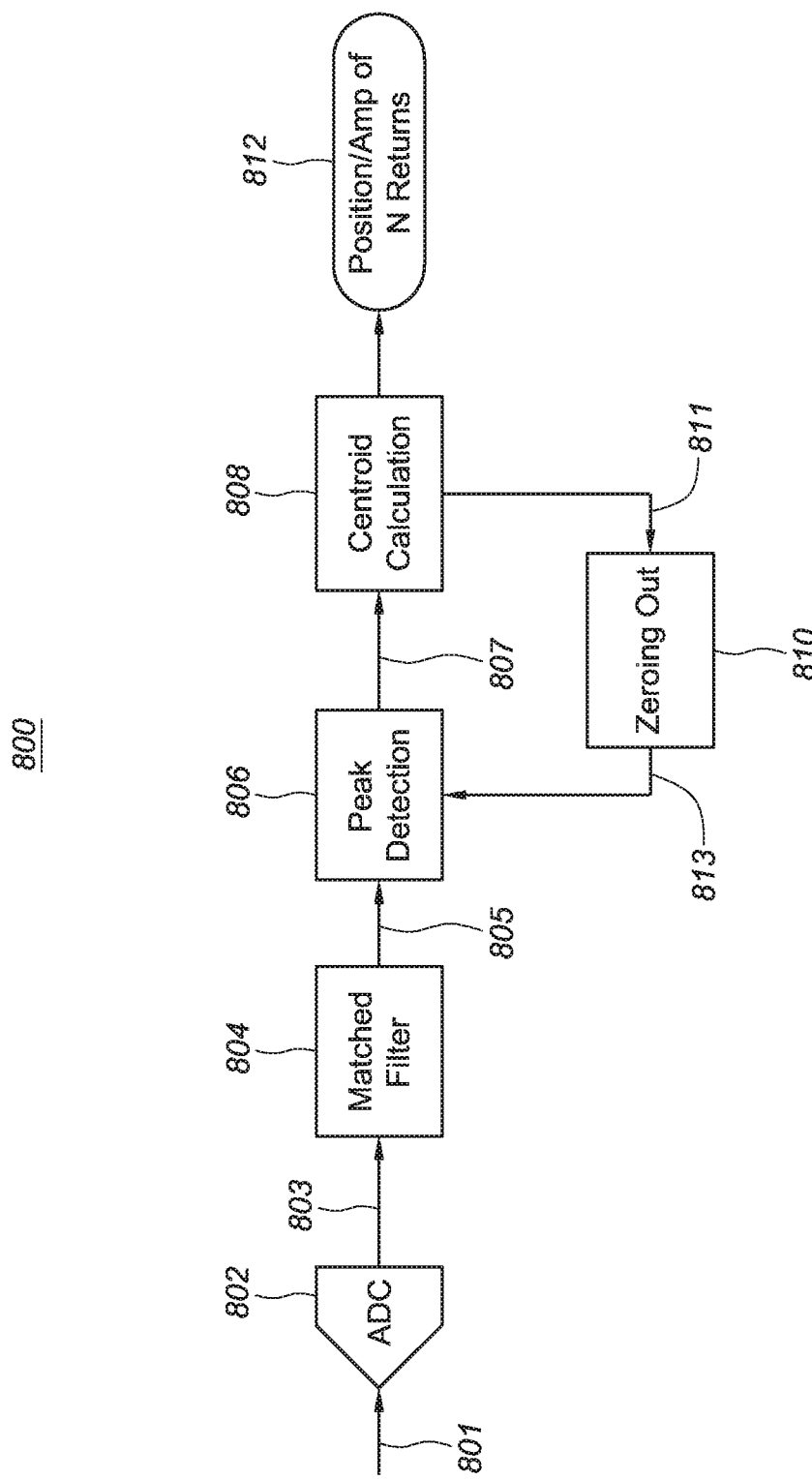
FIG. 8 depicts a multi-return recursive matched filter detector according to embodiments of the present document.

The parallel structure and separate thresholds may limit the efficiency of multi-return matched filter detector 700. FIG. 8 depicts an exemplary example of a multi-return recursive matched filter detector 800 according to embodiments of the present document. Multi-return recursive matched filter detector 800 may comprise ADC 802 which converts multi-return signal 801 to input signal 803. Multi-return signal 801 may comprise a sequence of N peaks in time period T. Input signal 803 may be processed by matched filter 804 to convolve the pulse shape of the transmitted laser signal in order to optimize the S/N ratio of input signal 803. The output of matched filter 804 may be matched filter signal 805. Matched filter signal 805 may be coupled to peak detection 806, which determines a peak detection signal 807 in a particular time period. Peak detection 806 may be coupled to centroid calculation 808, which derives a position of the maximum peak in the sequence with a centroid calculation algorithm. A centroid output2 811 of the centroid calculation 808 may be coupled to zeroing out 810, which removes current calculated peak by setting the peak value to zero or a DC level. A zeroing output 813 may be coupled to peak detection 806, which generates another peak detection signal 807. The another peak detection signal 807 has one less peak due to zeroing out 810 which removed the current calculated peak, i.e. the prior maximum peak. The process may repeat until the desired number (N) of return peaks have been processed by the peak detection 806, centroid calculation 808 and zeroing out 810. A return output1 812 from centroid calculation 808 may determine the position and amplitude of each of the N return peaks. From this determination, the first, last and maximum peaks of multi-return signal 801 may be identified. For some embodiments N may have a value of four. For other embodiments, which may demand more accurate results, N may be a value greater than four, e.g., ten return peaks.

Figure 9:
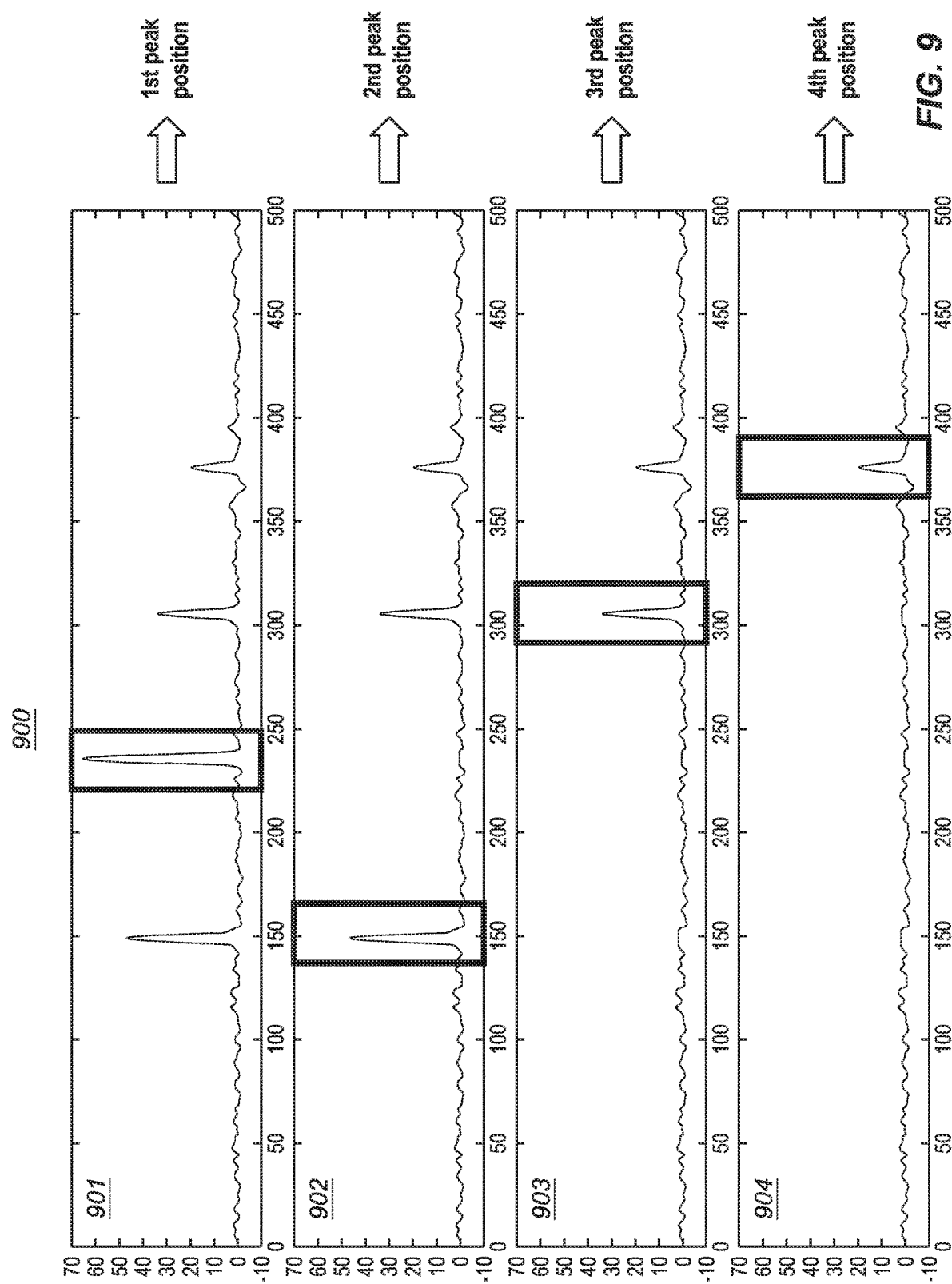
FIG. 9 graphically illustrates the selection of maximum peaks for various multi-return signal sequences by a multi-return recursive signal detector according to embodiments of the present document.

FIG. 9 graphically illustrates the selection of maximum peaks for various multi-return signal sequences 900 by a multi-return recursive signal detector according to embodiments of the present document. For FIG. 9, the Y-axis represents the amplitude of multi-return signal sequences 901-904, and the X-axis represents the time period (T) for processing of a multi-return signal sequences 901-904. Multi-return signal sequences 901-904 may be examples of outputs from peak detection 806 of FIG. 8 and may have resulted from multiple reflected signals included in multi-return signal 801. FIG. 2 illustrates an example of two reflected signals, return signal 203 and return signal 205, indicating N=2. FIG. 8 illustrates an example of four significant reflected signals (N=4), and the process to identify four peaks in time period T. The application may desire an identification of a greater number of peaks in time period T.

As illustrated in FIG. 9, multi-return signal sequence 901 may comprise four significant peaks. The centroid calculation 808 selects the highest peak in the time period (T) and assigns this peak as the 1st peak position. Centroid output2 811 may be coupled to zeroing out 810, where the peak at the 1st peak position may be set to zero or a DC level in the sequence. This processing causes the generation of multi-return signal sequence 902, which comprises a sequence of three peaks in time period (T). Similar processing by peak detection 806 and centroid calculation 808 identifies the highest peak in multi-return signal sequence 902 and assigns this peak as the 2nd peak position.

Multi-return signal sequence 902 may be coupled via centroid calculation 808 to zeroing out 810, where the peak at the 2nd peak position may be set to zero or a DC level. This processing causes the generation of multi-return signal sequence 903, which comprises a sequence of two peaks in time period (T). Similar processing by peak detection 806 and centroid calculation 808 identifies the highest peak in multi-return signal sequence 903 and assigns this peak as the 3rd peak position.

Similarly, multi-return signal sequence 903 may be coupled via centroid calculation 808 to zeroing out 810, where the peak at the 3rd peak position may be set to zero or a DC level. This processing causes the generation of multi-return signal sequence 904, which comprises a sequence of one peak in time period (T). Similar processing by peak detection 806 and centroid calculation 808 identifies the highest peak in multi-return signal sequence 904 and assigns this peak as the 4th peak position. At this point, the detector, such as multi-return recursive matched filter detector 800, has processed four peaks, i.e., N=4. From the aforementioned processing, the first return (2nd peak position), last return (4th peak position) and the maximum peak (1st peak position) may be identified.

There are several protocols for peak identification. These include: (1) Maximum return: first peak output from proposed detector; (2) M out or N return: Straightforward, first M output peaks of the N detected peaks are M maximum valid returns; (3) First/Last return: Sorting M output peaks according to the position, first and last peaks corresponds to the first and last return, respectively; (4) Instead of selecting M out of the N detected peaks, sort the N detected peaks by position, then first peak and last peak are the front peak and back peak, respectively.

Figure 10:
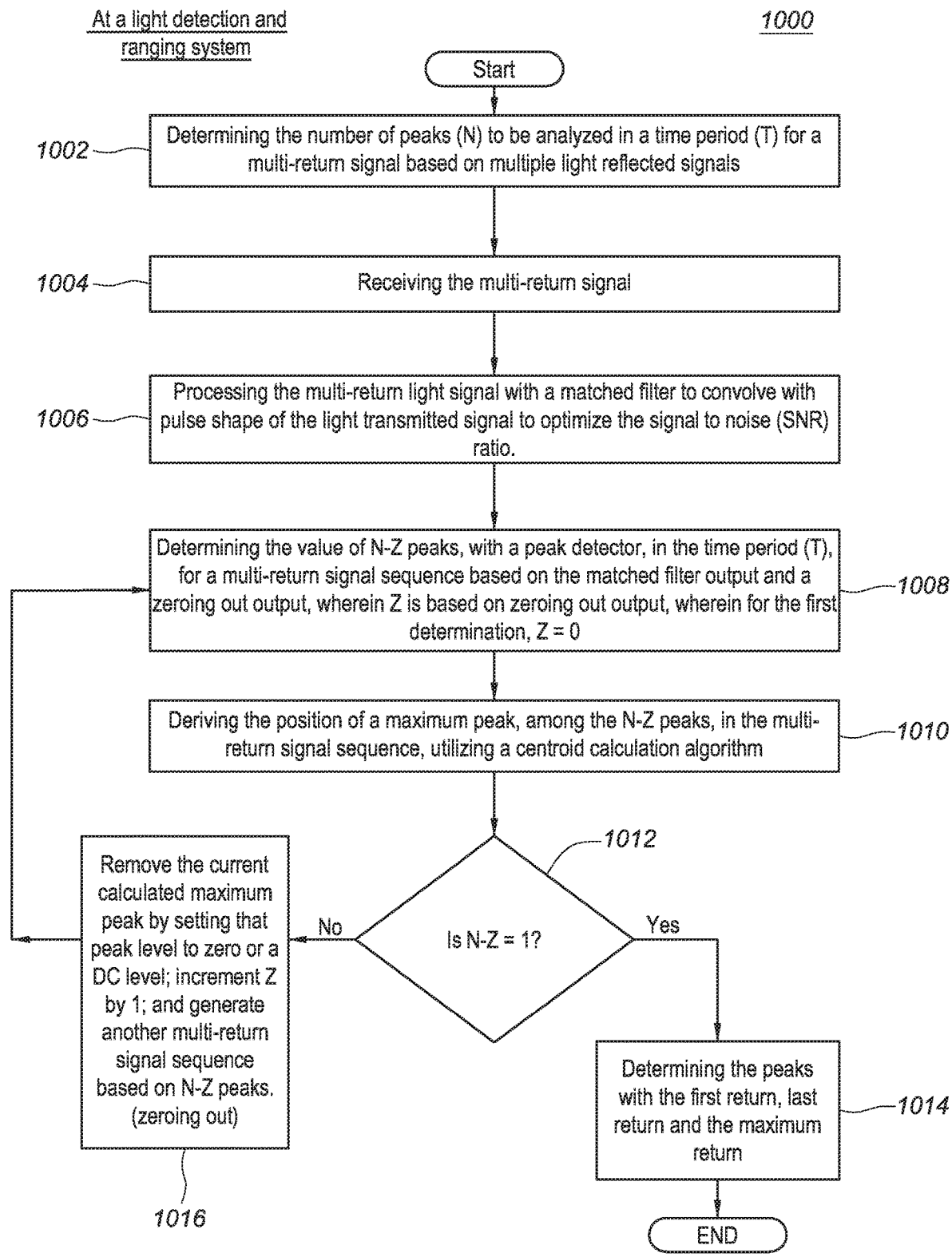
FIG. 10 depicts a flowchart for detecting multi-return light signals, according to embodiments of the present document.

FIG. 10 depicts a flowchart 1000 for detecting multi-return light signals, based on a multi-return recursive signal detector, according to embodiments of the present document. Flowchart 1000 comprises the steps of:

Determining the number of peaks (N) to be analyzed in a time period (T) for a multi-return light signal comprising multiple reflected signals. Each of the peaks may represent a signal of return light resulting from a single light emission, e.g., a laser firing, (step 1002)

Receiving the multi-return signal at a detector of a light detection and ranging system. (step 1004)

Processing the multi-return signal with a matched filter to convolve with pulse shape of light transmitted signal to optimize the signal to noise (SNR) ratio. Couple the matched filter output to a peak detector, (step 1006)

Determining the value of N-Z peaks, with a peak detector, in the time period (T), for a multi-return signal sequence based on the matched filter output and a zeroing out output, wherein Z is based on zeroing out output, wherein for the first determination, Z=0. (step 1008)

Deriving the position of a maximum peak, among the N-Z peaks, in the multi-return signal sequence, utilizing a centroid calculation algorithm, (step 1010)

If N-Z is equal to one (step 1012), determining the peaks with the first return, last return and the maximum return, (step 1014)

If N-Z is not equal to one (step 1012), remove the current calculated maximum peak by setting that peak level to zero or a DC level; increment Z by 1; and generate another multi-return signal sequence based on N-Z peaks, (zeroing out), (step 1016)

Repeat step 1008 based on another multi-return peak sequence comprising N-Z peaks.

By way of summary, a multi-return detector may comprise a matched filter operable to receive a multi-return signal comprising N peaks in a time period; a peak detector coupled to receive an output of the matched filter and operable to determine a first maximum peak of the multi-return signal in the time period; a centroid calculation operable to derive a position of the first maximum peak of the multi-return signal in the time period; and a zeroing out function that eliminates the first maximum peak from the multi-return signal to allow the peak detector to determine a second maximum peak and the centroid calculation derive the position of the second maximum peak in the time period. The peak detector, the centroid calculation and the zeroing out function determine subsequent maximum peaks until M peaks of the N peaks are detected in the multi-return signal in the time period. The centroid calculation determines a first peak, a last peak and a maximum peak in the multi-return signal in the time period.

C. Maximum Finder Solutions

Another embodiment according to the present documents for efficient of multi-return detection incorporates a maximum finding functionality with matched filter functionality and peak detector functionality. FIGS. 11A-11D and 13 depict a multi-return detectors 1100-1160 and 1300, comprising matched filter detectors, peak detectors and maximum finders according to embodiments of the present document. Each embodiment may include the following elements: (1) noise statistics 1101 (which includes mean and variance noise statistics), (2) threshold computation 1102, (3) matched filter 1103 and (4) peak detector 1104. A multi-return signal 1111 may be coupled to an analog-to-digital conversion (ADC), which generates input signal 1112, which in turn may be coupled to noise statistics 1101 and matched filter 1103. Noise statistics 1101 may define the mean and RMS noise environment as was previous described, herein. The mean value and RMS value of noise of an input signal 1112 may be calculated by excluding the samples above a threshold for the peaks of input signal 1112. The output of noise statistics 1101 may be coupled to threshold computation 1102. Threshold computation 1102 determines a peak detector threshold based on the output of noise statistics 1101 (i.e. noise variations) and a precomputed constant error rate, based on $Pf_a$, to compute a threshold. The threshold may be coupled to an input of the peak detector 1104.

Multi-return signal 1111 may comprise a sequence of N peaks in time period T, as illustrated in FIG. 9. As previously discussed, the ADC generates input signal 1112 that may be processed by matched filter 1103 to convolve the pulse shape of the transmitted laser signal in order to optimize the S/N ratio of input signal 1112. The output of matched filter 1103, matched filter signal 1113, may comprise the sequence of N peaks, like input signal 1112, but with an optimized S/N ratio and slight time delay. Matched filter signal 1113 may be coupled to peak detector 1104, which determines peak magnitudes and valid signal index of peak for the sequence N peaks in time period T. In one embodiment, match filtered 1103 operates at a rate of 8 samples per clock.

As discussed herein, the term "largest peak" may indicate that the peak is has a larger magnitude than other peaks being compared in the sequence of peaks. The term "second largest peak" may indicate that the peak is the second largest magnitude compared to the first largest peak in the sequence of N peaks. The aforementioned description may be applicable for the multi-return detectors 1100-1160 and 1300, as depicted in FIGS. 11A-11D and 13A.

Figure 11A:
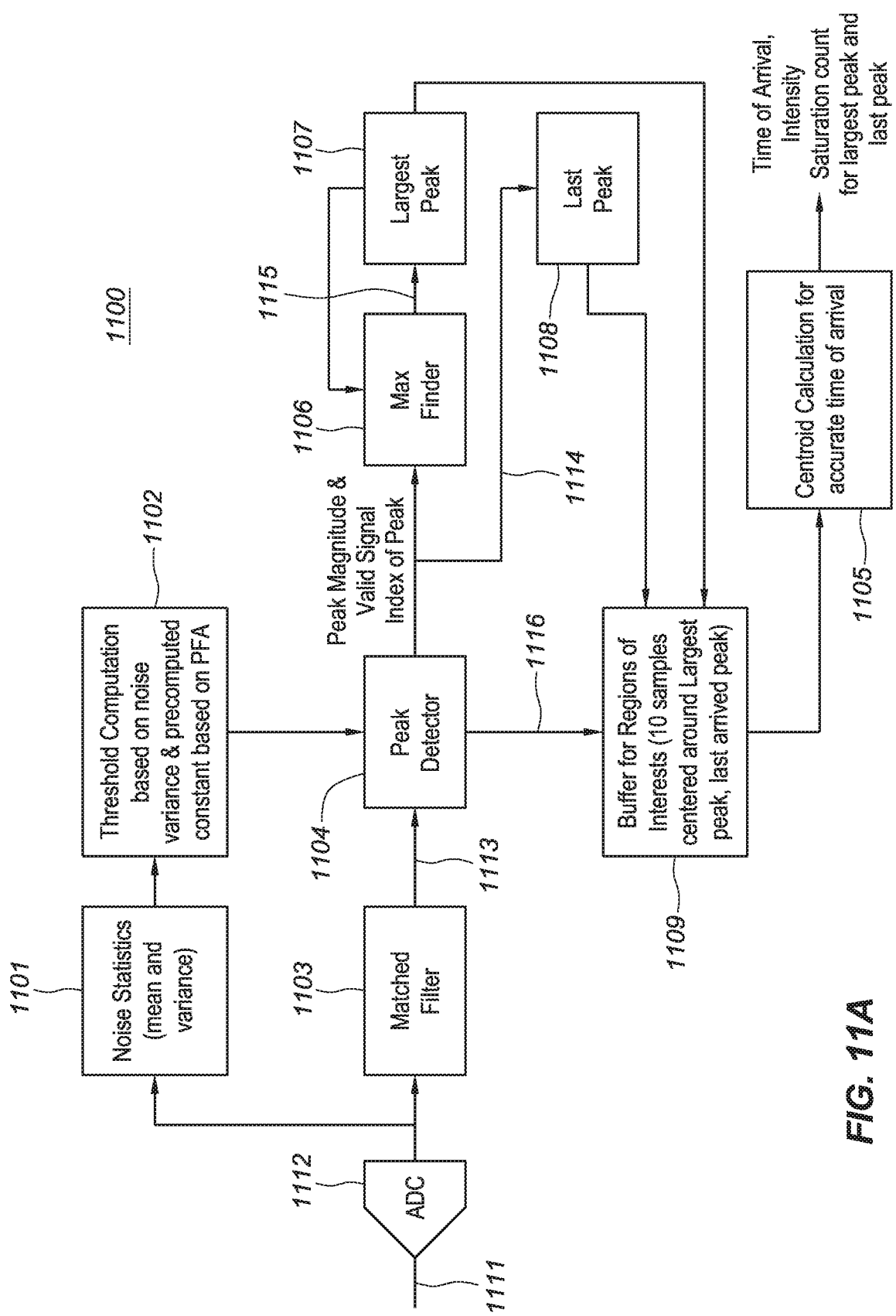
FIG. 11A depicts a multi-return detector comprising a matched filter and maximum finder according to embodiments of the present document.

Relative to FIG. 11A and multi-return detector 1100, the output of peak detector 1104, peak detector output 1114, may be coupled to max finder 1106 and last peak 1108. Max finder 1106 may analyze the sequence of N peaks in time period T of peak detector output 1114 to determine largest peak in the sequence. Max finder 1106 may generate max finder output 1115, which includes the amplitude and position of largest peak. This information may be stored in largest peak 1107. Separately, last peak 1108 may monitor peak detector output 1114 and store an amplitude and position of the last peak in the sequence.

Buffer 1109 may store samples based on regions of interests for the sequence. For multi-return detector 1100, the regions of interests may include the largest peak and the last arrived peak. Buffer 1109 may receive a trigger signal 1116 from peak detector 1104, which initiates an action to buffer samples from largest peak 1107 and last peak 1108. Buffer 1109 may store S samples centered around the largest peak and R samples centered the last arrived peak. In some embodiments, S may be equal to 10 and R may be equal to 10. An output of buffer 1109 may be coupled to centroid calculation 1105, which in turn may determine a time of arrival and intensity saturation count for the largest peak and last peak.

Figure 11B:
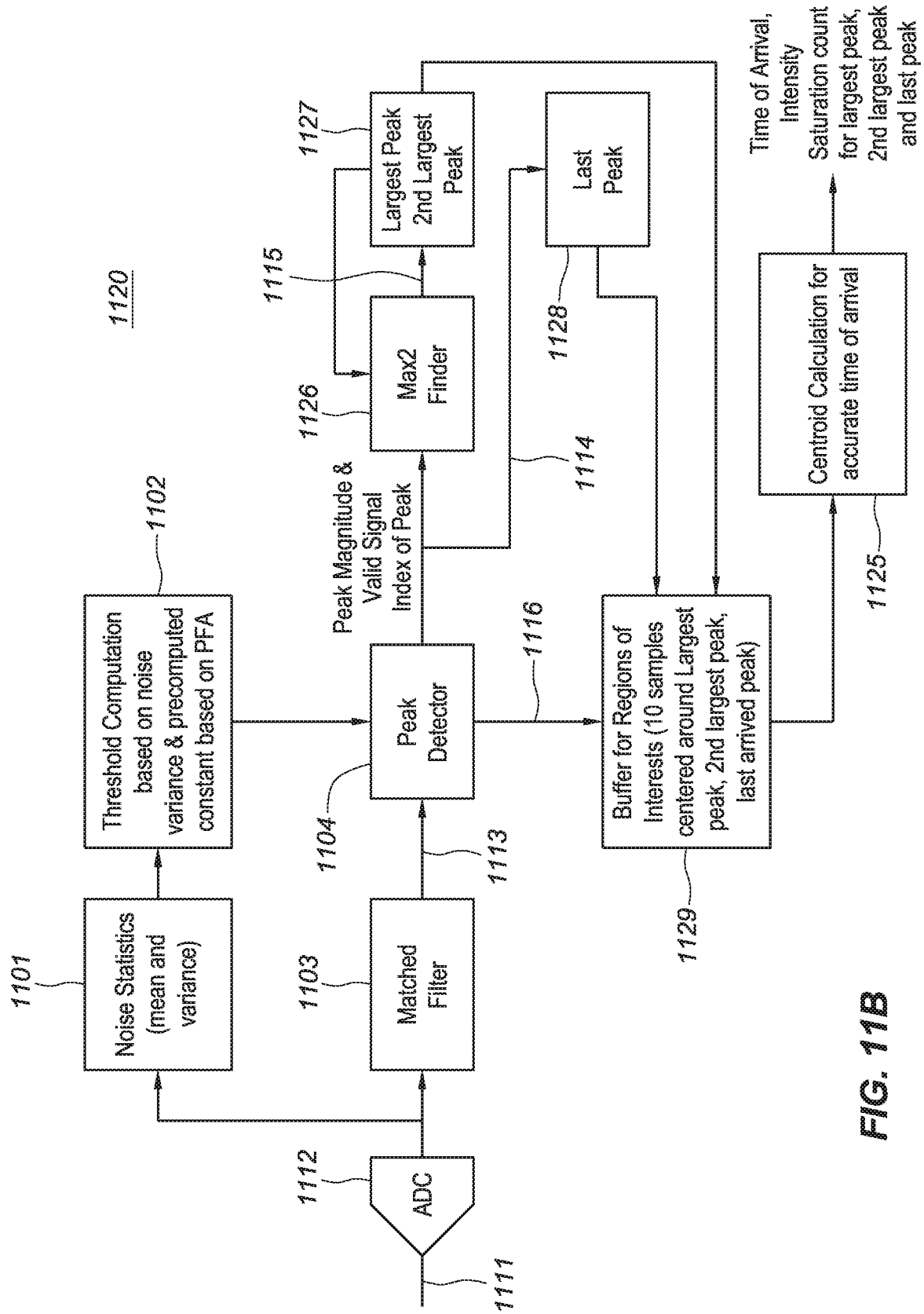
FIG. 11B depicts another multi-return detector comprising a matched filter and maximum finder according to embodiments of the present document.

Relative to FIG. 11B and multi-return detector 1120, the output of peak detector 1104, peak detector output 1114, may be coupled to max finder 1126 and last peak 1128. Max finder 1126 may analyze the sequence of N peaks in time period T of peak detector output 1114 to determine largest peak in the sequence. Max finder 1126 may generate max finder output 1115, which includes the amplitude and position of largest peak and the second largest peak. This information may be stored in largest peak/$2^{nd}$ largest peak 1127. Separately, last peak 1128 may monitor peak detector output 1114 and store an amplitude and position of the last peak in the sequence.

Buffer 1129 may store samples based on regions of interests for the sequence. For multi-return detector 1120, the regions of interests may include the largest peak, second largest peak and the last arrived peak. Buffer 1129 may receive a trigger signal 1116 from peak detector 1104, which initiates an action to buffer samples from largest peak/$2^{nd}$ largest peak 1127 and last peak 1128. Buffer 1129 may store S samples centered around the largest peak, Q samples centered around the second largest peak and R samples centered the last arrived peak. In some embodiments, S may be equal to 10, Q may be equal to 10 and R may be equal to 10. An output of buffer 1129 may be coupled to centroid calculation 1125, which in turn may determine a time of arrival and intensity saturation count for the largest peak, $2^{nd}$ largest peak and last peak.

Figure 11C:
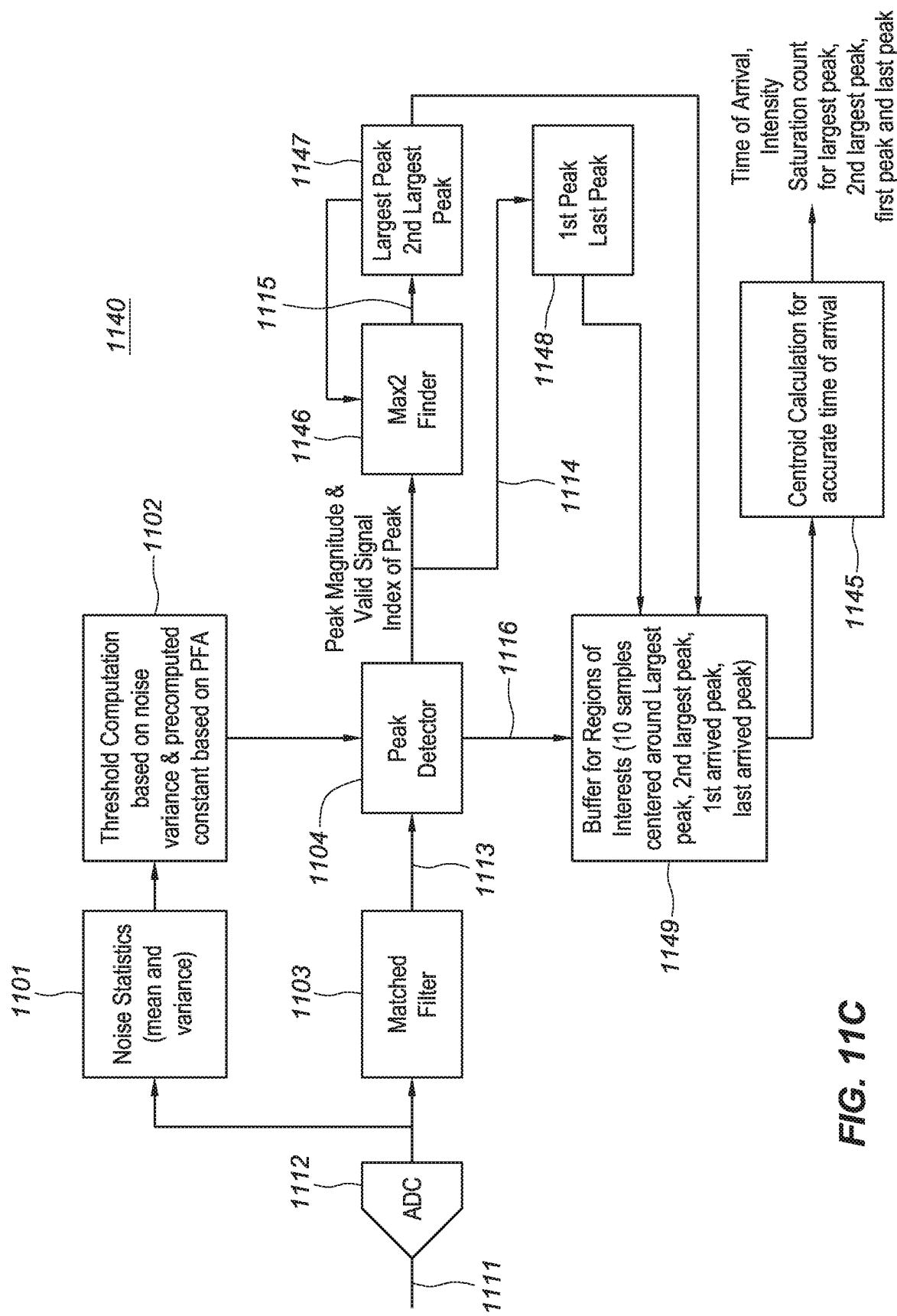
FIG. 11C depicts yet another multi-return detector comprising a matched filter and maximum finder according to embodiments of the present document.

Relative to FIG. 11C and multi-return detector 1140, the output of peak detector 1104, peak detector output 1114, may be coupled to max finder 1146 and $1^{st}$ peak/last peak 1148. Max finder 1146 may analyze the sequence of N peaks in time period T of peak detector output 1114 to determine largest peak and $2^{nd}$ largest peak in the sequence. Max finder 1146 may generate max finder output 1115, which includes the amplitude and position of largest peak and the 2nd largest peak. This information may be stored in largest peak/$2^{nd}$ largest peak 1147. Separately, $1^{st}$ peak/last peak 1148 may monitor peak detector output 1114 and store an amplitude and position of the $1^{st}$ peak and last peak in the sequence.

Buffer 1149 may store samples based on regions of interests for the sequence. For multi-return detector 1140, the regions of interests may include the largest peak, $2^{nd}$ largest peak $1^{st}$ arrived peak and the last arrived peak. Buffer 1149 may receive a trigger signal 1116 from peak detector 1104, which initiates an action to buffer samples from largest peak/$2^{nd}$ largest peak 1147 and $1^{st}$ peak/last peak 1148. Buffer 1149 may store S samples centered around the largest peak, Q samples centered around the 2nd largest peak, P samples centered around the $1^{st}$ arrived peak and R samples centered the last arrived peak. In some embodiments, S may be equal to 10, Q may be equal to 10, P may be equal to 10 and R may be equal to 10. An output of buffer 1149 may be coupled to centroid calculation 1145, which in turn may determine a time of arrival and intensity saturation count for the largest peak, $2^{nd}$ largest peak, $1^{st}$ arrived peak and last peak.

Figure 11D:
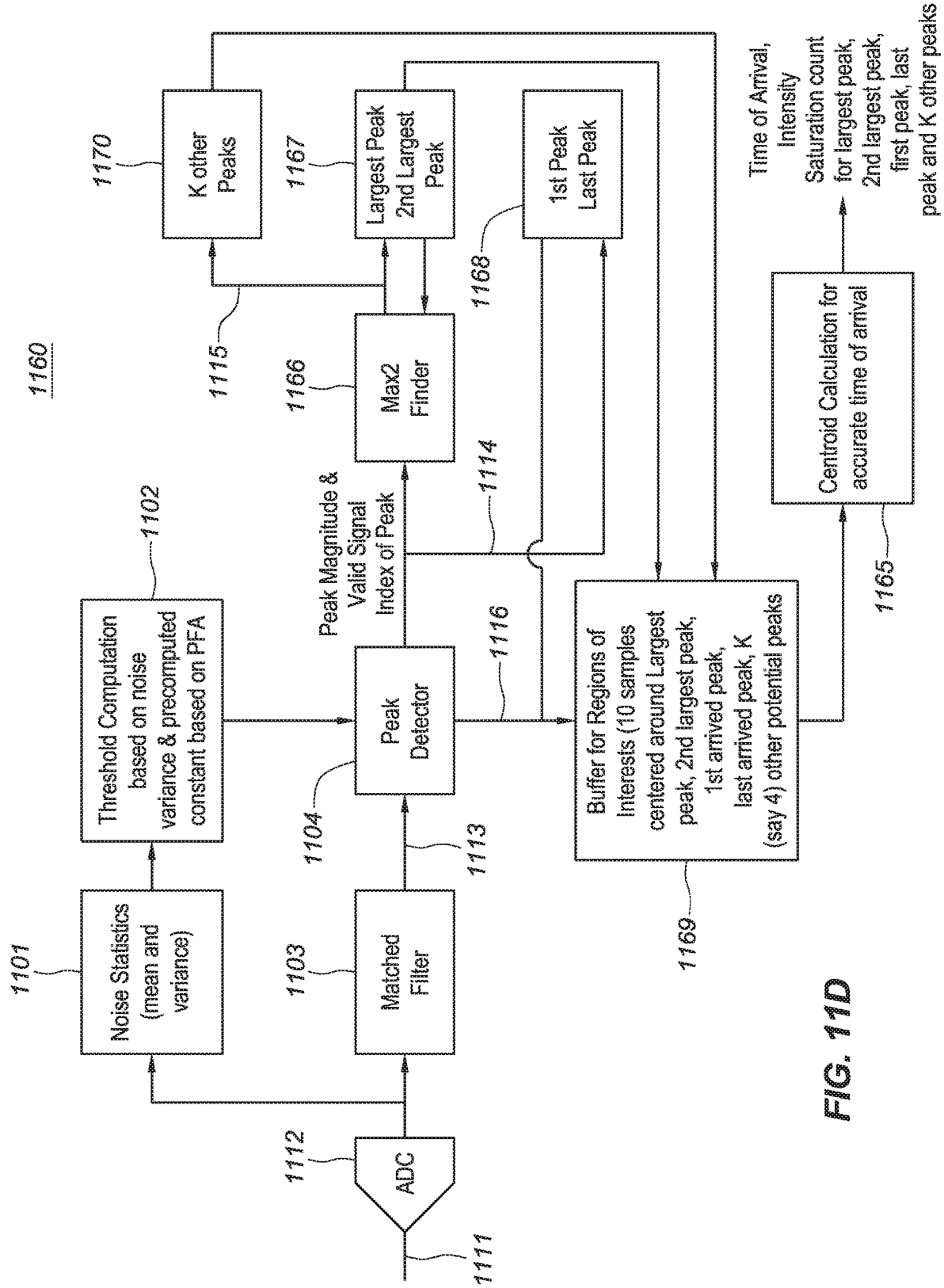
FIG. 11D depicts yet another multi-return detector comprising a matched filter and maximum finder according to embodiments of the present document.

Relative to FIG. 11D and multi-return detector 1160, the output of peak detector 1104, peak detector output 1114, may be coupled to max finder 1166 and $1^{st}$ peak/last peak 1168. Max finder 1166 may analyze the sequence of N peaks in time period T of peak detector output 1114 to determine largest peak, $2^{nd}$ largest peak and K other potential peaks in the sequence. Max finder 1166 may generate max finder output 1115, which includes the amplitude and position of largest peak, the $2^{nd}$ largest peak and K other potential peaks. This information may be stored in largest peak/$2^{nd}$ largest peak 1167 and K other peaks 1170. Separately, $1^{st}$ peak/last peak 1168 may monitor peak detector output 1114 and store an amplitude and position of the $1^{st}$ peak and last peak in the sequence.

Buffer 1169 may store samples based on regions of interests for the sequence. For multi-return detector 1160, the regions of interests may include the largest peak, $2^{nd}$ largest peak $1^{st}$ arrived peak, last arrived peak and K other potential peaks. Buffer 1169 may receive a trigger signal 1116 from peak detector 1104, which initiates an action to buffer samples from largest peak/$2^{nd}$ largest peak 1167, $1^{st}$ peak/last peak 1168 and K other peaks 1170. Buffer 1169 may store S samples centered around the largest peak, Q samples centered around the 2nd largest peak, P samples centered around the $1^{st}$ arrived peak, R samples centered the last arrived peak and K other peaks. In some embodiments, S may be equal to 10, Q may be equal to 10, P may be equal to 10, R may be equal to 10 and K may be equal to 4. An output of buffer 1169 may be coupled to centroid calculation 1165, which in turn may determine a time of arrival and intensity saturation count for the largest peak, $2^{nd}$ largest peak, $1^{st}$ arrived peak, last peak and K other peaks.

By way of summary, a multi-return detector may comprise a matched filter operable to filter a multi-return signal comprising a sequence of N peaks in a time period; a peak detector coupled to receive an output of the matched filter and operable to determine peak magnitudes of each peak of the sequence of N peaks in the time period; a maximum finder operable to select one or more maximum peaks from the sequence of N peaks in the time period; a register operable to select one or more peaks based on a time of arrival; and a buffer operable to generate a number of samples centered around each of the selected peak.

D. Blinding Spot of Largest Peaks (Hidden Peaks)

The multi-return detectors 1100-1160 that incorporate maximum finding functionality with a matched filter and peak detector may be challenged in an environment where multiple peaks in a return signal are in close time proximity of one another, such as in a blinding environment. What may be desired is to identify a peak in a blinding spot of the largest peak.

For example, laser-based night vision systems may not overcome the blinding effects associated with highly reflective objects. Many signs have highly reflective surfaces for reflection of incandescent light, such as that emitted from vehicle headlamps, for direct viewing ease by a vehicle operator. The signs are often covered with retro-reflective paint that can reflect a large amount of light and cause image saturation. A saturated image may be generally unclear and unreadable. Large flat surfaces, such as on trucks, buses, and vans, can also cause image saturation.

For a laser based detector, such as a LIDAR system, blinding may occur due to a reverse bias condition for an avalanche photodiode (APD). When the APD is in reverse diode recovery, the APD may be insensitivity to light. This situation may prevent further detection for a light detection system until the APD recovers. In some embodiments, but without limitation, recovery time may be several nanoseconds and may cause a blinding spot of a few meters.

Figure 12A:
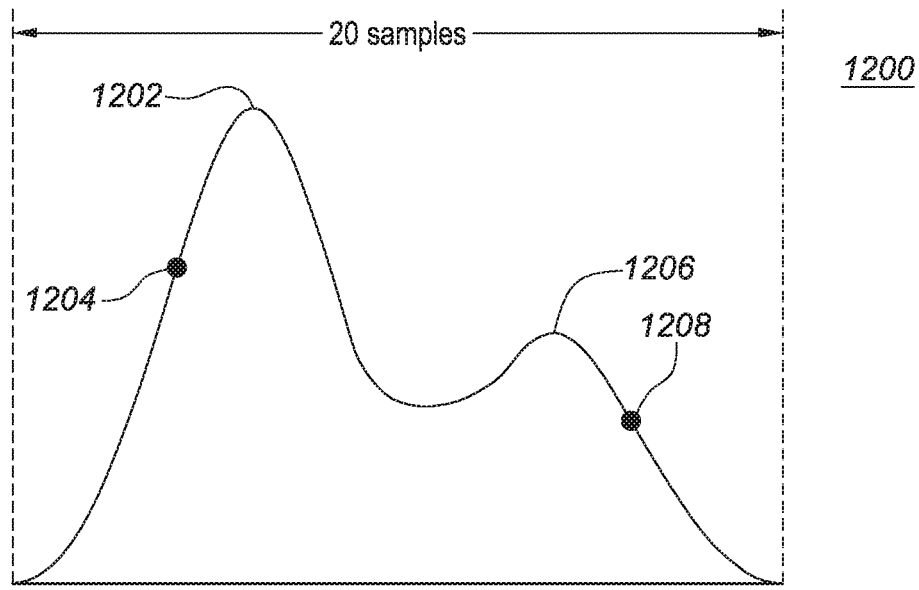
FIG. 12A graphically illustrates a waveform of a return signal comprising overlapping waveforms 1200 according to according to embodiments of the present document.

FIG. 12A graphically illustrates a waveform of a return signal comprising overlapping waveforms 1200 according to according to embodiments of the present document. Overlapping waveforms 1200 include peak 1202 and peak 1206, where peak 1202 may be the largest peak, and peak 1206 may be a hidden peak or in a blinding spot of the largest peak. Potentially, given the time proximity of the two peaks, a multi-return detector may only detect one peak in the waveform of FIG. 12A.

A method to detect two peaks in overlapping waveforms 1200 may comprise first identifying the largest peak, then utilize a compute buffer to identify a peak hidden immediately after the largest peak by zeroing out the contribution of the waveform of the largest peak. Basically, the process involves re-building the original shape of the return signal peaks. With max finder functionality, the peak 1202, which is the largest peak, may be identified. For the regions of interests, 20 samples are obtained for the overlapping waveform as illustrated in FIG. 12A. With this information the amplitude and positon of the largest peak may be determined.

Figure 12B:
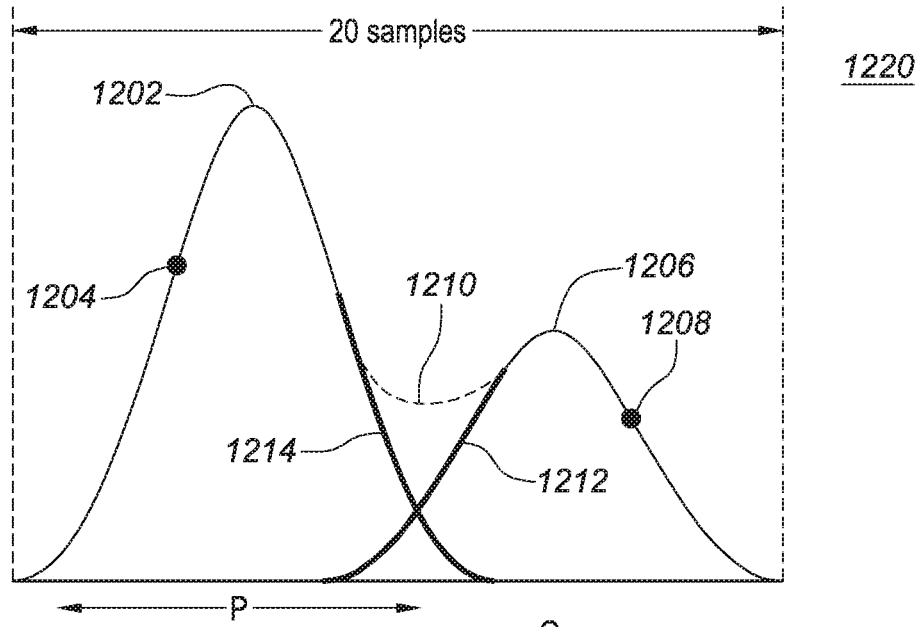
FIG. 12B graphically illustrates the original waveforms 1220 for the two overlapping peaks of FIG. 12A according to according to embodiments of the present document.

FIG. 12B graphically illustrates the original waveforms 1220 for the two overlapping peaks of FIG. 12A according to according to embodiments of the present document. The original shape of the waveform for peak 1202 may be determined based on slope 1204, as illustrated by wave segment 1214 combined with the other portion of the waveform associated with peak 1202. Then the original shape of the waveform for peak 1202 may be subtracted (zeroed out) from the original overlapping waveform of the two peaks to obtain the shape of the waveform associated with peak 1206, as illustrated in FIG. 12B. See wave segment 1212. The slope of the waveform associated with peak 1206 may be slope 1208, which may assist in determining wave segment 1212. In some embodiments, a compute buffer function may sample peak 1202 and peak 1206 in order to obtain the original waveforms with these respective peaks. There may be P samples centered at Peak 1202, the largest peak. There may be Q samples centered at peak 1206, the hidden peak. In some embodiments P and Q may be equal to 10 samples.

Figure 13A:
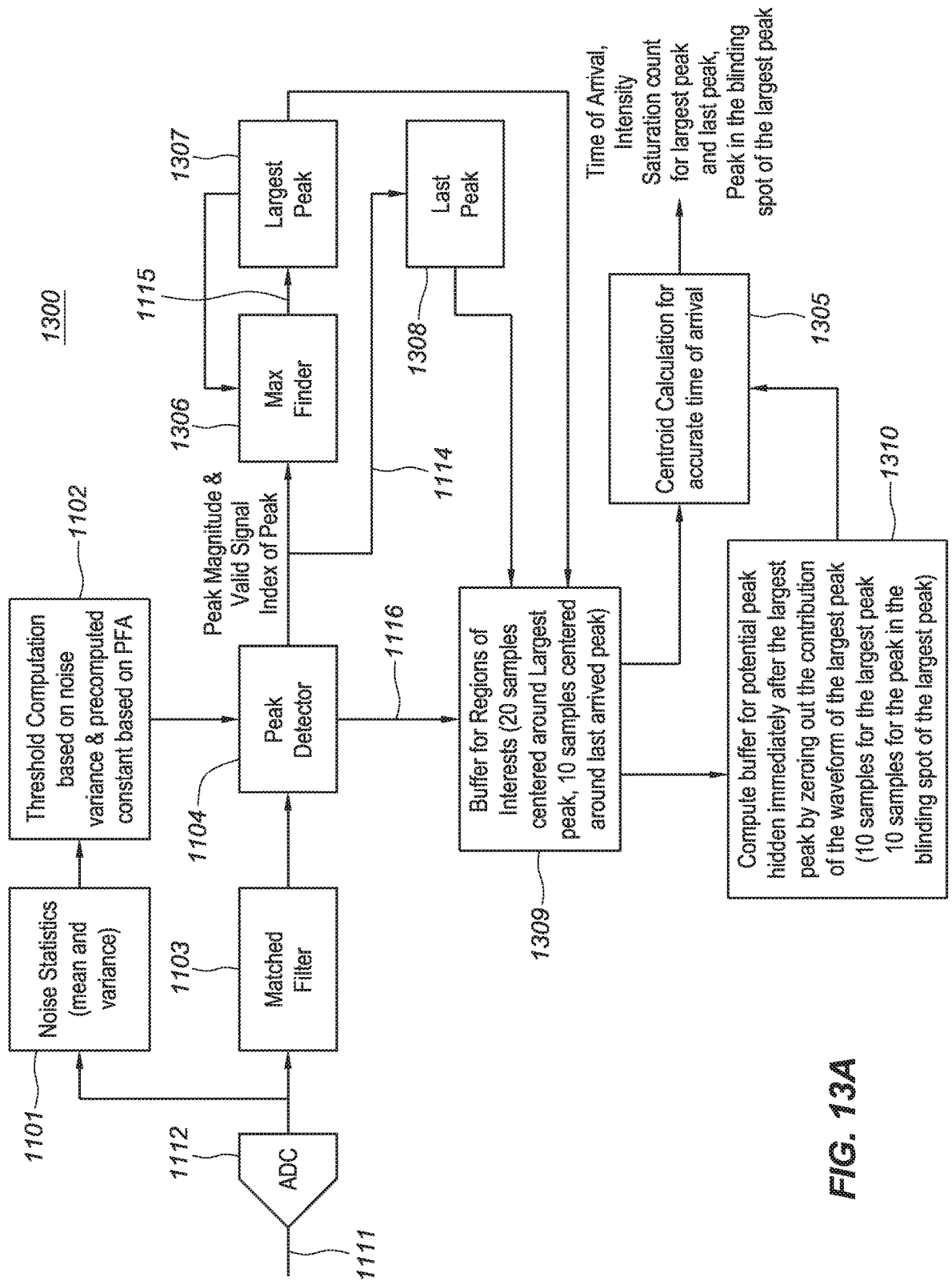
FIG. 13A depicts a multi-return detector comprising a matched filter, a maximum finder and an anti-blinding processing according to embodiments of the present document.

FIG. 13A depicts a multi-return detector 1300 comprising matched filtering, a maximum finder and a compute buffer. Multi-return detector 1300 may be operable to detect a hidden peak in the blinding spot of a largest peak. Relative to FIG. 13A and multi-return detector 1300, noise statistics 1101, threshold computation 1102, matched filter 1103 and peak detector 1104 may have the same functionality as described relative to FIG. 11A.

For FIG. 13A and multi-return detector 1300, the output of peak detector 1104, peak detector output 1114, may be coupled to max finder 1306 and last peak 1308. Max finder 1306 may analyze the sequence of N peaks in time period T of peak detector output 1114 to determine largest peak in the sequence. Max finder 1306 may generate max finder output 1115, which includes the amplitude and position of largest peak. This information may be stored in largest peak 1307.

Separately, last peak 1308 may monitor peak detector output 1114 and store an amplitude and position of the last peak in the sequence.

Buffer 1309 may select and store samples based on regions of interests for the sequence. For multi-return detector 1300, the regions of interests may include the largest peak and the last arrived peak. Buffer 1309 may receive a trigger signal 1116 from peak detector 1104, which initiates an action to buffer samples from largest peak 1307 and last peak 1308. Buffer 1309 stores S samples centered around the largest peak and R samples centered the last arrived peak. In some embodiments, S may be equal to 20 and R may be equal to 10. Outputs of buffer 1309 may be coupled to centroid calculation 1305 and compute buffer 1310.

Compute buffer 1310 may receive the samples associated with the regions of interests. Compute buffer 1310 may identify a potential peak hidden immediately after the largest peak by zeroing out the contribution of the largest peak. Compute buffer 1310 may generate P samples for the largest peak and Q samples for the peak in the blinding spot of the largest peak. In some embodiments, P and Q are equal to 10 samples.

Centroid calculation 1305 may receive the sample information from buffer 1309 and compute buffer 1310 and may determine a time of arrival and intensity saturation count for the largest peak, last peak, and peak in the blinding spot of the largest peak.

Figure 13B:
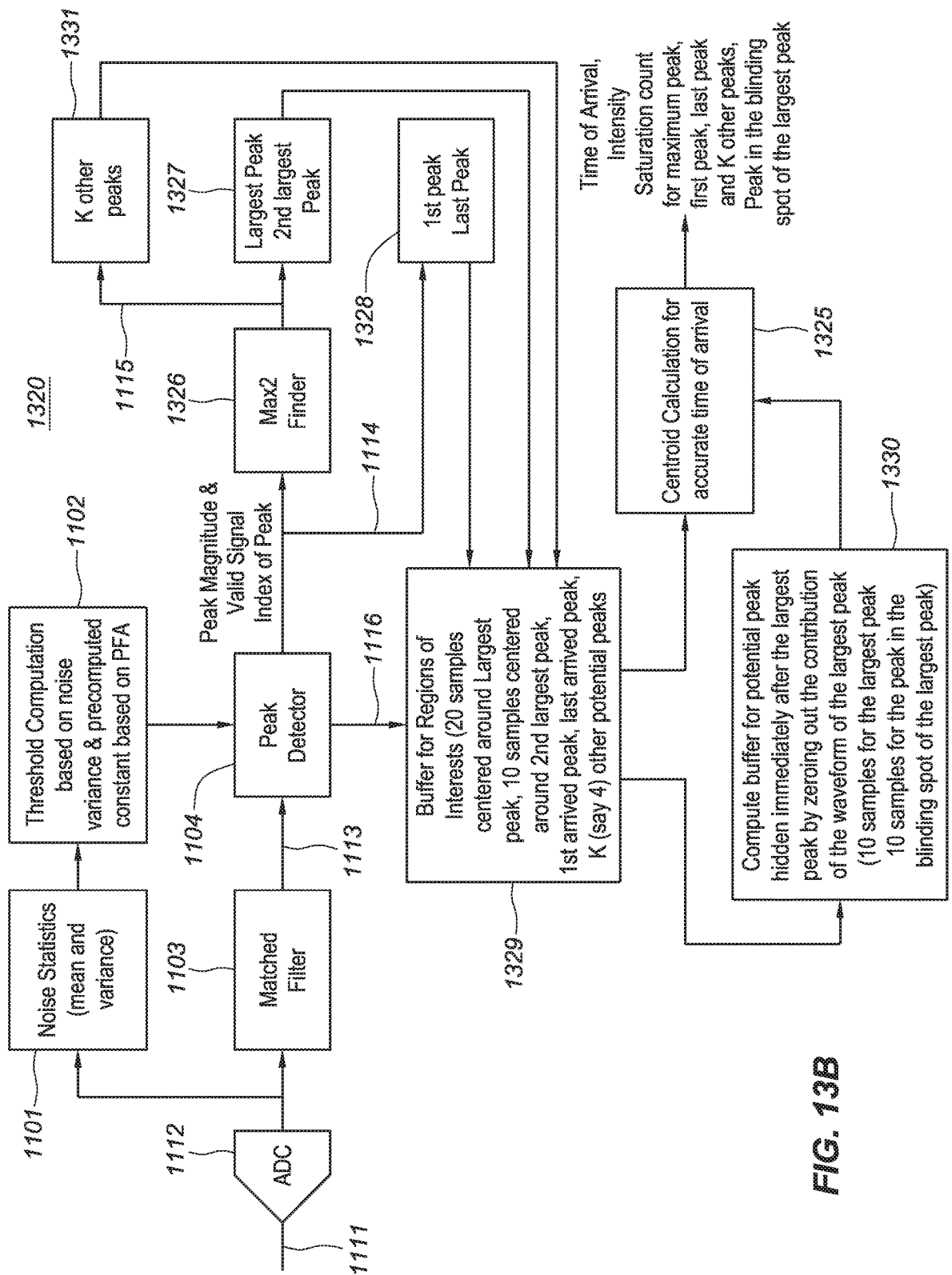
FIG. 13B depicts another multi-return detector comprising a matched filter, a maximum finder and an anti-blinding processing according to embodiments of the present document.

FIG. 13B depicts another multi-return detector 1320 comprising matched filtering, a maximum finder and a compute buffer. Multi-return detector 1320 may be operable to detect a hidden peak in the blinding spot of a largest peak. Relative to FIG. 13B and multi-return detector 1320, noise statistics 1101, threshold computation 1102, matched filter 1103 and peak detector 1104 may have the same functionality as described relative to FIG. 11A.

For FIG. 13B and multi-return detector 1320, the output of peak detector 1104, peak detector output 1114, may be coupled to max finder 1326 and first peak/last peak 1328. Max finder 1326 may analyze the sequence of N peaks in time period T of peak detector output 1114 to determine largest peak in the sequence. Max finder 1326 may generate max finder output 1115, which includes the amplitude and position of largest peak, second largest peak and K other peaks. This information may be stored in largest peak/second largest peak 1327 and K other peaks 1331. Separately, first peak/last peak 1328 may monitor peak detector output 1114 and store an amplitude and position of the first peak/last peak in the sequence.

Buffer 1329 may select and store samples based on regions of interests for the sequence. For multi-return detector 1320, the regions of interests may include the largest peak, second largest peak, first arrived peak, the last arrived peak, and K other potential peaks. In some embodiments, K may be equal to four. Buffer 1329 may receive a trigger signal 1116 from peak detector 1104, which initiates an action to buffer samples from largest peak/second largest peak 1327, K other peaks 1331 and first peak/last peak 1328. Buffer 1329 may store S samples centered around the largest peak, P samples centered around the second largest peak, first arrived peak, the last arrived peak, and K other potential peaks. In some embodiments, S may be equal to 20, P may be equal to 10, and K may be equal to four. Outputs of buffer 1329 may be coupled to centroid calculation 1325 and compute buffer 1330.

Compute buffer 1330 may receive the samples associated with the regions of interests. Compute buffer 1330 may identify a potential peak hidden immediately after the largest peak by zeroing out the contribution of the largest peak. Compute buffer 1330 may generate P samples for the largest peak and Q samples for the peak in the blinding spot of the largest peak. In some embodiments, P and Q are equal to 10 samples.

Centroid calculation 1325 may receive the sample information from buffer 1329 and compute buffer 1330 and may determine a time of arrival and intensity saturation count for maximum peak, first peak, last peak, K other peaks and peak in the blinding spot of the largest peak.

By way of summary, a multi-return detector may comprise a matched filter operable to filter a multi-return signal comprising a sequence of N peaks in a time period; a peak detector coupled to receive an output of the matched filter and operable to determine peak magnitudes of each peak of the sequence of N peaks in the time period; a maximum finder operable to select a largest peak from the sequence of N peaks in the time period; a register operable to select a last peak from the sequence of N peaks in the time period; a first buffer operable to generate a X samples centered around the largest peak and to generate Y samples centered around the last peak; and a second buffer operable to detect a peak hidden in a blinding spot immediately after the largest peak by zeroing out a contribution of a waveform of the largest peak, a centroid calculation operable for determining time of arrival, intensity saturation count for largest peak, last peak, and a peak in the blinding spot immediately after the largest peak.

E. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a LIDAR device, personal computer (e.g., laptop), tablet computer, phablet, personal digital assistant (PDA), smart phone, smart watch, smart package, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more memory devices, one or more network ports for communicating with external devices as well as various input and output (I/O) devices, such as touchscreen and/or a video display. The computing system may also include one or more buses operable to transmit communications between the various hardware components.

Figure 14:
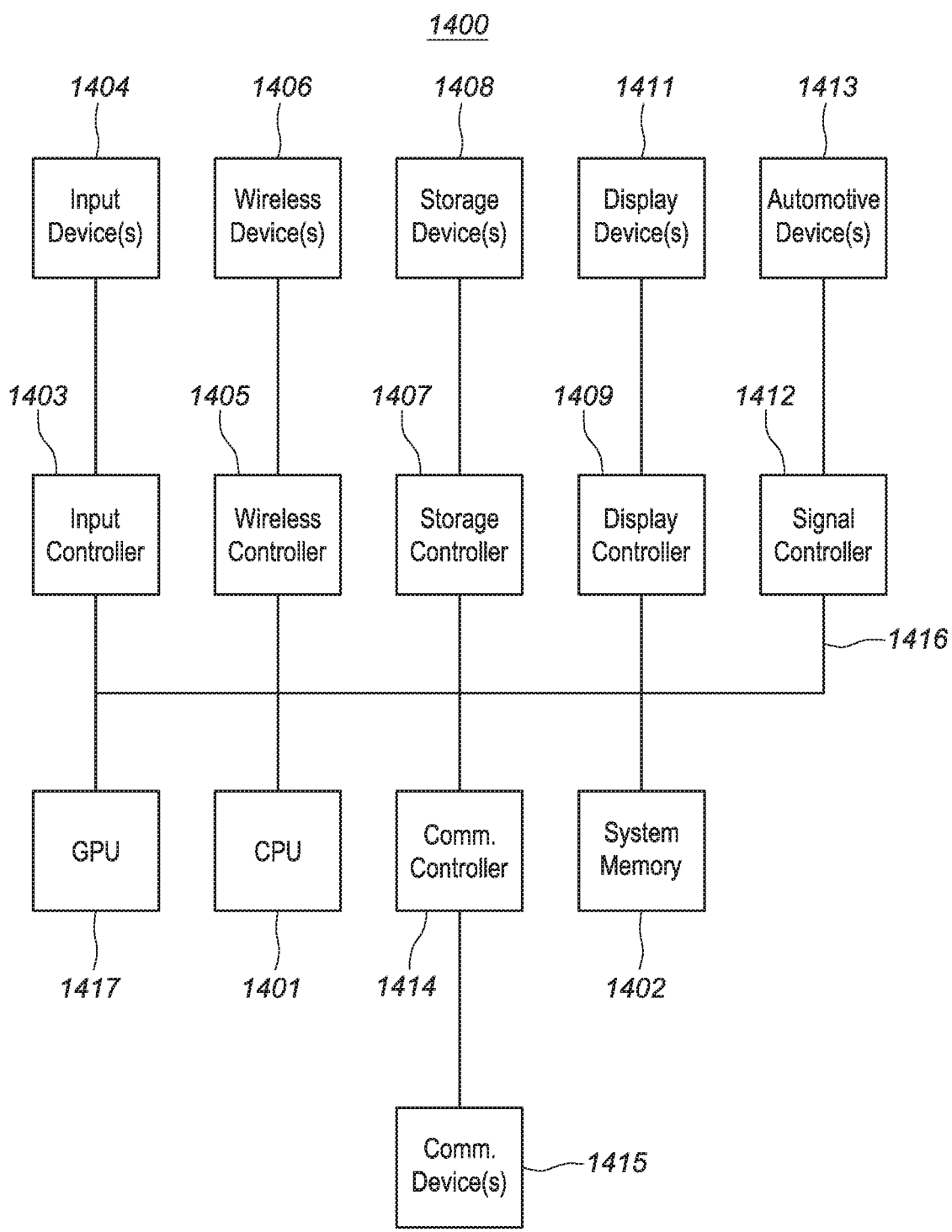
FIG. 14 depicts a simplified block diagram of a computing device/information handling system, in accordance with embodiments of the present document.

FIG. 14 depicts a simplified block diagram of a computing device/information handling system (or computing system) according to embodiments of the present disclosure. It will be understood that the functionalities shown for system 1400 may operate to support various embodiments of an information handling system—although it shall be understood that an information handling system may be differently configured and include different components.

As illustrated in FIG. 14, system 1400 includes one or more central processing units (CPU) 1401 that provides computing resources and controls the computing device. CPU 1401 may be implemented with a microprocessor or the like, and may also include one or more graphics processing units (GPU) 1417 and/or a floating point coprocessor for mathematical computations or any other type of coprocessor. System 1400 may also include a system memory 1402, which may be in the form of random-access memory (RAM), readonly memory (ROM), or both.

A number of controllers and peripheral devices may also be provided, as shown in FIG. 14. An input controller 1403 represents an interface to various input device(s) 1404, such as a keyboard, mouse, or stylus. There may also be a wireless controller 1405, which communicates with a wireless device 1406. System 1400 may also include a storage controller 1407 for interfacing with one or more storage devices 1408 each of which includes various types of storage medium. Storage device(s) 1408 may also be used to store processed data or data to be processed in accordance with the invention. System 1400 may also include a display controller 1409 for providing an interface to a display device 1411. The computing system 1400 may also include an automotive signal controller 1412 for communicating with one or more automotive systems (e.g., autonomous driving system) 1413. A communications controller 1414 may interface with one or more communication devices 1415, which enables system 1400 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A multiple-return light signal detection method for a light detection and ranging (LIDAR) system, the method comprising:
   receiving a multi-return signal having a plurality of peaks in a time period;
   filtering the multi-return signal based, at least in part, on a pulse shape of an emitted laser beam, to produce a filtered signal;
   identifying a largest peak of the filtered signal in the time period;
   eliminating the largest peak from the filtered signal;
   and detecting a peak hidden in a blinding spot occurring temporally after the largest peak.

2. The method of claim 1 further comprising emitting the laser beam prior to receiving the multi-return signal.

3. The method of claim 1, wherein filtering the multi-return signal comprises convolving the multi-return signal with a signal having the pulse shape of the emitted laser beam.

4. The method of claim 1, wherein detecting a peak hidden in a blinding spot comprises:
   selecting and storing samples for a plurality of regions of interest for the sequence of two or more peaks in the time period; and
   zeroing out a contribution of a waveform of the largest peak using the samples for the regions of interest.

5. A light detection and ranging (LIDAR) system comprising:
   one or more signal processing components configured to:
   receive a multi-return signal having a plurality of peaks in a time period;
   filter the multi-return signal based, at least in part, on a pulse shape of an emitted laser beam, to produce a filtered signal; identify a largest peak of the filtered signal in the time period;
   eliminate the largest peak from the filtered signal; and
   detect a peak hidden in a blinding spot occurring temporally after the largest peak.

6. The system of claim 5 further comprising a transmitter configured to emit the laser beam prior to receiving the multi-return signal.

7. The system of claim 5, wherein filtering the multi-return signal comprises convolving the multi-return signal with a signal having the pulse shape of the emitted laser beam.

8. The system of claim 5, wherein, detecting a peak hidden in a blinding spot comprises:
   selecting and storing samples for a plurality of regions of interest for the sequence of two or more peaks in the time period; and
   zeroing out a contribution of a waveform of the largest peak using the samples for the regions of interest.

* * * * *